United States Patent
Yang et al.

(10) Patent No.: US 12,363,246 B2
(45) Date of Patent: Jul. 15, 2025

(54) RECORDING METHOD AND DEVICE

(71) Applicant: Huawei Technologies Co., Ltd., Shenzhen (CN)

(72) Inventors: Xiao Yang, Shenzhen (CN); Zhou Zhu, Shanghai (CN); Hao Zheng, Shanghai (CN); Yinan Zhang, Shanghai (CN); Liangfei Lu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 158 days.

(21) Appl. No.: 18/042,808

(22) PCT Filed: Jul. 22, 2021

(86) PCT No.: PCT/CN2021/107868
§ 371 (c)(1),
(2) Date: Feb. 24, 2023

(87) PCT Pub. No.: WO2022/042151
PCT Pub. Date: Mar. 3, 2022

(65) Prior Publication Data
US 2023/0319217 A1    Oct. 5, 2023

(30) Foreign Application Priority Data
Aug. 25, 2020 (CN) .......................... 202010863700.9

(51) Int. Cl.
*H04N 5/14* (2006.01)
*G10L 13/033* (2013.01)
(Continued)

(52) U.S. Cl.
CPC .............. *H04N 5/14* (2013.01); *G10L 13/033* (2013.01); *G10L 21/0208* (2013.01);
(Continued)

(58) Field of Classification Search
CPC ...... H04N 5/14; H04N 5/765; H04N 21/2187; H04N 21/42203; H04N 21/4223; H04N 21/4307; H04N 21/4334; H04N 21/43637; H04N 21/439; H04N 21/44227; H04N 21/4788; H04N 21/8106; H04N 21/854; H04N 9/8211; H04N 5/76; G10L 13/033; G10L 21/0208; G10L 19/0017; G10L 21/02; G11B 20/10527;
(Continued)

(56) References Cited

U.S. PATENT DOCUMENTS 9,900,355 B2 * 2/2018 Zheng .................... H04L 65/403
9,955,061 B2 * 4/2018 Carbonell .............. G06V 20/41
(Continued)

FOREIGN PATENT DOCUMENTS

CN    109413215 A    3/2019
WO    2020032788 A1    2/2020

*Primary Examiner* — Shahbaz Nazrul
(74) *Attorney, Agent, or Firm* — Conley Rose, P.C.

(57) ABSTRACT

A distributed recording system includes a first device and one or more second devices. The first device sends a distributed recording instruction, to control the one or more second devices to perform recording. The one or more second devices send audio data obtained through recording to an upper-layer recording application.

20 Claims, 16 Drawing Sheets

(51) Int. Cl.
*G10L 21/0208* (2013.01)
*G11B 20/10* (2006.01)

(52) U.S. Cl.
CPC ............ *G11B 20/10527* (2013.01); *G11B 2020/10537* (2013.01); *G11B 2020/10777* (2013.01)

(58) Field of Classification Search
CPC .......... G11B 2020/10537; G11B 2020/10777; G11B 2020/10546; H04M 1/72412; H04M 1/6008; H04M 2250/52; G11C 7/16; H04W 84/12
See application file for complete search history.

(56) References Cited

U.S. PATENT DOCUMENTS

| | | | | |
|---|---|---|---|---|
| 2014/0143338 | A1* | 5/2014 | Jung | H04N 1/00148 709/204 |
| 2014/0163971 | A1* | 6/2014 | Song | H04R 3/00 704/201 |
| 2015/0032797 | A1* | 1/2015 | Pan | H04L 67/01 709/203 |
| 2015/0294542 | A1* | 10/2015 | Wada | G08B 13/19669 348/152 |
| 2017/0289681 | A1* | 10/2017 | Yuan | H04N 23/61 |
| 2019/0215540 | A1 | 7/2019 | Nicol et al. | |
| 2024/0348842 | A1* | 10/2024 | Davoodi | H04N 21/26613 |

\* cited by examiner

Terminal device

RECORDING METHOD AND DEVICE

CROSS-REFERENCE TO RELATED APPLICATIONS

This is a U.S. National Stage of International Patent Application No. PCT/CN2021/107868 filed on Jul. 22, 2021, which claims priority to Chinese Patent Application No. 202010863700.9 filed on Aug. 25, 2020. Both of the aforementioned applications are hereby incorporated by reference in their entireties.

TECHNICAL FIELD

This application relates to the audio field, and in particular, to a distributed recording method and device.

BACKGROUND

Currently, as short videos and live broadcast industries emerge, it is increasingly common for people to shoot videos and perform live broadcast by using mobile phones, and related software is increasing. When people perform image shooting by using a mobile phone, if a photographed object is far away from a camera device, a sound of the photographed object is easily covered by noise in an environment. Consequently, it is difficult to clearly record the sound of the photographed object. For example, when people perform image shooting in a noisy environment, a sound of a narration and a commentary cannot be clearly recorded due to the noise in the environment.

For example, when a user performs live broadcast as a live streamer, the user usually wears a wired headset to receive a sound. However, a connection cable of the wired headset brings great inconvenience to user activities and limits an activity range. Therefore, generally, the user needs to additionally purchase an external recording accessory, or use a wireless microphone (microphone, MIC) device. It may be understood that the wireless MIC device may include a transmitter and a receiver. It is clearly that, the additionally purchased external recording accessory or the wireless MIC device is expensive, and a device size is large. During use, the MIC needs to be connected or fixed to the mobile phone in a wired manner, an orientation and parameters of the MIC even needs to be manually set in some devices, and the MIC needs to be removed after use. It is clearly that, the foregoing device is only suitable for use by a professional, and is not applicable to a common user.

Therefore, without adding any other device, how to simply, conveniently, and clearly record the sound of the photographed object anytime and anywhere becomes an urgent problem to be resolved, and is of great significance for improving recording experience of the user.

SUMMARY

Embodiments of this application provide a recording method. In a wireless local area network, a receiver sends a distributed recording instruction to one or more transmitters in a distributed recording manner, so that the one or more transmitters perform distributed recording according to the distributed recording instruction, and feed back audio data obtained through recording to the receiver. The receiver performs time alignment, noise reduction, and/or decompression on one or more pieces of the received audio data, and sends the audio data to an upper-layer recording application. This ensures that a user can clearly record sound of a photographed object, a narration, and a commentary anytime and anywhere without a need to purchase any external device.

According to a first aspect, a distributed recording system is provided. The system includes at least two terminal devices, and the at least two terminal devices include a first device and at least one second device. The first device and the second device may be mobile phones, tablet computers, wearable devices, or the like. The first device is configured to receive input information of a user, and determine a recording mode based on the input information. The first device is further configured to: when the recording mode is a distributed recording mode, send a distributed recording start instruction to the at least one second device. The second device is configured to receive the distributed recording start instruction, and collect first audio data in a periodicity according to the distributed recording start instruction. The first audio data is local audio data collected by the second device. The second device is further configured to perform human voice enhancement and/or noise reduction processing on the first audio data collected in a periodicity, and then send the first audio data to the first device in a same periodicity. The first device is further configured to receive at least one piece of the first audio data, so that a camera application invokes the at least one piece of the first audio data. In this application, the receiver controls one or more transmitters to perform recording, and sends audio data obtained through recording to an upper-layer recording application. This ensures that a user can clearly record sound of a photographed object, a narration, and a commentary anytime and anywhere without a need to purchase any external device.

In a possible implementation, the second device is further configured to: determine a recording parameter according to the distributed recording start instruction, and collect the first audio data based on the recording parameter.

In a possible implementation, before the second device sends the first audio data collected in a periodicity to the first device in the same periodicity, the second device is further configured to perform compression processing on the first audio data collected in a periodicity, to obtain compressed first audio data. In this application, collected audio data is compressed, so that a data size in a transmission process can be effectively reduced, and data security in the transmission process is ensured.

In a possible implementation, the first device is further configured to: when the first audio data is compressed data, perform audio decompression on the compressed first audio data, to obtain decompressed first audio data. In this application, received compressed audio data may be further decompressed, to reduce a data amount during data transmission, and ensure lossless restoration of the audio data after receiving.

In a possible implementation, the distributed recording mode includes a multi-device collaborative recording mode. When the recording mode is the multi-device collaborative recording mode, before the camera application invokes the at least one piece of the first audio data, the first device is further configured to collect second audio data. The camera application invokes the at least one piece of the first audio data and the second audio data. The second audio data is local audio data collected by the first device. In this application, in combination with local audio data collected by a receiver, it may be further ensured that a sound of a photographed object, a narration, and a commentary can be clearly recorded in a video shooting process.

In a possible implementation, before the camera application invokes the at least one piece of the first audio data, the first device is further configured to: when there are a plurality of pieces of the first audio data, perform a time alignment operation on the plurality of pieces of the first audio data: or when the recording mode is the multi-device collaborative recording mode, perform the time alignment operation on the at least one piece of the first audio data and the second audio data. In this application, after a plurality of pieces of audio data are received, time alignment is performed on the plurality of pieces of audio data, to avoid a time error between different audio due to transmission.

In a possible implementation, before the camera application invokes the at least one piece of the second audio data, the first device is further configured to perform noise reduction and/or human voice enhancement processing on the second audio data. In this application, preprocessing such as noise reduction and human voice enhancement may be further performed on audio, so that the audio uploaded to the camera application is clearer.

In a possible implementation, the distributed recording mode includes a first distributed recording sub-mode and a second distributed recording sub-mode. When the recording mode is the first distributed recording sub-mode, the first device is further configured to send a distributed recording instruction to one second device, and receive the first audio data sent by the second device. Alternatively, when the recording mode is the second distributed recording sub-mode, the first device is further configured to send a distributed recording instruction to a plurality of the second devices, and receive the first audio data sent by the plurality of the second devices.

In a possible implementation, before the first device sends the distributed recording start instruction to the at least one second device, the system further includes: The first device is further configured to send a distributed recording request to the at least one second device. The second device is further configured to receive the distributed recording request sent by the first device. The second device is further configured to display prompt information on a display of the second device. The prompt information is used to prompt whether the second device is allowed to perform distributed recording. The second device is further configured to send a distributed recording response message to the first device. The distributed recording response message is used to indicate whether the second device is allowed to perform distributed recording. The first device is further configured to receive the distributed recording response message sent by the at least one second device. The first device is further configured to send the distributed recording start instruction to the at least one second device allowed to perform distributed recording.

In a possible implementation, the recording mode further includes a local recording mode. The first device is further configured to perform switching among the local recording mode, the first distributed recording sub-mode, the second distributed recording sub-mode, and the multi-device collaborative recording mode based on the input information entered by the user.

In a possible implementation, the first device is further configured to display a distributed recording icon on a display of the first device.

In a possible implementation, the second device is further configured to display a distributed recording prompt icon on the display of the second device.

According to a second aspect, a recording terminal device is provided. The recording terminal device is a first device or a second device. The recording terminal device includes a display, a processor, a memory, a transmitter, and a receiver. When the recording terminal device is the first device, the receiver is configured to receive input information of a user, and determine a recording mode based on the input information; and the processor is configured to: when the recording mode is a distributed recording mode, control the transmitter to send a distributed recording start instruction to at least one second device. When the recording terminal device is the second device, the receiver is configured to receive the distributed recording start instruction, and collect first audio data in a periodicity according to the distributed recording start instruction, where the first audio data is local audio data collected by the second device; and the transmitter is configured to: perform human voice enhancement and/or noise reduction processing on the first audio data collected in a periodicity, and then send the first audio data to the first device in a same periodicity. When the recording terminal device is the first device, the receiver is further configured to receive at least one piece of the first audio data; and the processor is further configured to control a camera application to invoke the at least one piece of the first audio data. In this application, the receiver controls one or more transmitters to perform recording, and sends audio data obtained through recording to an upper-layer recording application. This ensures that a user can clearly record sound of a photographed object, a narration, and a commentary anytime and anywhere without a need to purchase any external device.

In a possible implementation, when the recording terminal device is the second device, the processor is configured to: determine a recording parameter according to the distributed recording start instruction, and control, based on the recording parameter, a microphone to collect the first audio data.

In a possible implementation, when the recording terminal device is the second device, the processor is further configured to perform compression processing on the first audio data collected in a periodicity, to obtain compressed first audio data. In this application, collected audio data is compressed, so that a data size in a transmission process can be effectively reduced, and data security in the transmission process is ensured.

In a possible implementation, when the recording terminal device is the second device, the processor is further configured to: when the first audio data is compressed data, perform audio decompression on the compressed first audio data, to obtain decompressed first audio data. In this application, received compressed audio data may be further decompressed, to reduce a data amount during data transmission, and ensure lossless restoration of the audio data after receiving.

In a possible implementation, the distributed recording mode includes a multi-device collaborative recording mode. When the recording terminal device is the first device, the processor is further configured to: when the recording mode is the multi-device collaborative recording mode, collect second audio data. The camera application invokes the at least one piece of the first audio data and second audio data. The second audio data is local audio data collected by the first device. In this application, in combination with local audio data collected by a receiver, it may be further ensured that a sound of a photographed object, a narration, and a commentary can be clearly recorded in a video shooting process.

In a possible implementation, when the recording terminal device is the first device, the processor is further configured to: when there are a plurality of pieces of the first audio data, perform a time alignment operation on the plurality of pieces of the first audio data; or when the recording mode is the multi-device collaborative recording mode, perform the time alignment operation on the at least one piece of the first audio data and the second audio data. In this application, after a plurality of pieces of audio data are received, time alignment is performed on the plurality of pieces of audio data, to avoid a time error between different audio due to transmission.

In a possible implementation, when the recording terminal device is the first device, the processor is further configured to perform noise reduction and/or human voice enhancement processing on the second audio data. In this application, preprocessing such as noise reduction and human voice enhancement may be further performed on audio, so that the audio uploaded to the camera application is clearer.

In a possible implementation, the distributed recording mode includes a first distributed recording sub-mode and a second distributed recording sub-mode. When the recording terminal device is the first device, the transmitter is further configured to: when the recording mode is the first distributed recording sub-mode, send a distributed recording instruction to one second device. Alternatively, the transmitter is further configured to: when the recording mode is the second distributed recording sub-mode, send a distributed recording instruction to a plurality of second devices. The receiver is further configured to: when the recording mode is the first distributed recording sub-mode, receive the first audio data sent by the second device or when the recording mode is the second distributed recording sub-mode, receive the first audio data sent by the plurality of second devices.

In a possible implementation, when the recording terminal device is the first device, the transmitter is further configured to send a distributed recording request to at least one second device. When the recording terminal device is the second device, the receiver is further configured to receive the distributed recording request sent by the first device. The display is further configured to display prompt information on a display of the second device. The prompt information is used to prompt whether the second device is allowed to perform distributed recording.

The transmitter is further configured to send a distributed recording response message to the first device. The distributed recording response message is used to indicate whether the second device is allowed to perform distributed recording.

When the recording terminal device is the first device, the receiver is further configured to receive the distributed recording response message sent by the at least one second device.

The transmitter is further configured to send the distributed recording start instruction to the at least one second device allowed to perform distributed recording.

In a possible implementation, the recording mode further includes a local recording mode. When the recording terminal device is the first device, the processor is further configured to perform switching among the local recording mode, the first distributed recording sub-mode, the second distributed recording sub-mode, and the multi-device collaborative recording mode based on the input information entered by the user.

In a possible implementation, when the recording terminal device is the first device, the display is configured to display a distributed recording icon on a display of the first device.

In a possible implementation, when the recording terminal device is the second device, the display is configured to display a distributed recording prompt icon on the display of the second device.

According to a third aspect, a computer-readable storage medium is provided. The computer-readable storage medium stores instructions, and when the instructions are run on a terminal, the terminal is enabled to perform the method according to any one of the possible implementations of the first aspect.

According to a fourth aspect, a computer program device including instructions is provided. When the instructions are run on a terminal, the terminal is enabled to perform the method according to any one of the possible implementations of the first aspect.

This application discloses a distributed recording method and device. A receiver sends a distributed recording instruction, to control one or more transmitters to perform recording, and send audio data obtained through recording to an upper-layer recording application. This ensures that a user can clearly record sound of a photographed object, a narration, and a commentary anytime and anywhere without a need to purchase any external device.

DESCRIPTION OF EMBODIMENTS

The following describes the technical solutions in embodiments of this application with reference to the accompanying drawings in embodiments of this application.

Figure 1:
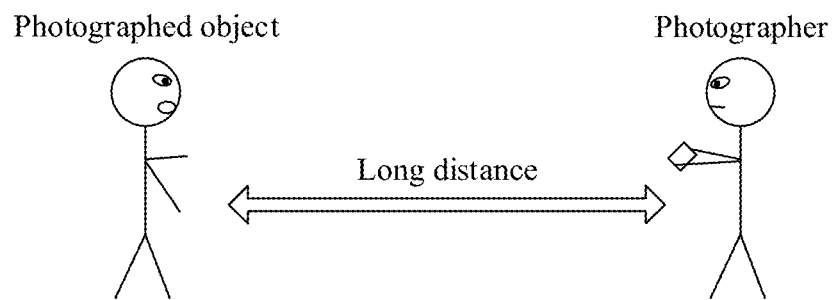
FIG. 1 is a schematic diagram of a distributed recording scenario according to an embodiment of this application.

This application is mainly applied to a scenario in which a terminal device is used to perform video shooting. For example, as shown in FIG. 1, in this scenario, a photographer performs video shooting on a photographed object. In this case, a distance between the photographed object and the photographer is relatively long. Therefore, a camera device used by the photographer cannot clearly collect and record a sound of the photographed object. In addition, if a narration and a commentary exist during video shooting, due to a location difference, the camera device used by the photographer cannot clearly collect and record a sound of the narration and the commentary.

Figure 2A:
FIG. 2A is a schematic diagram of a specialized recording device.
Figure 2B:
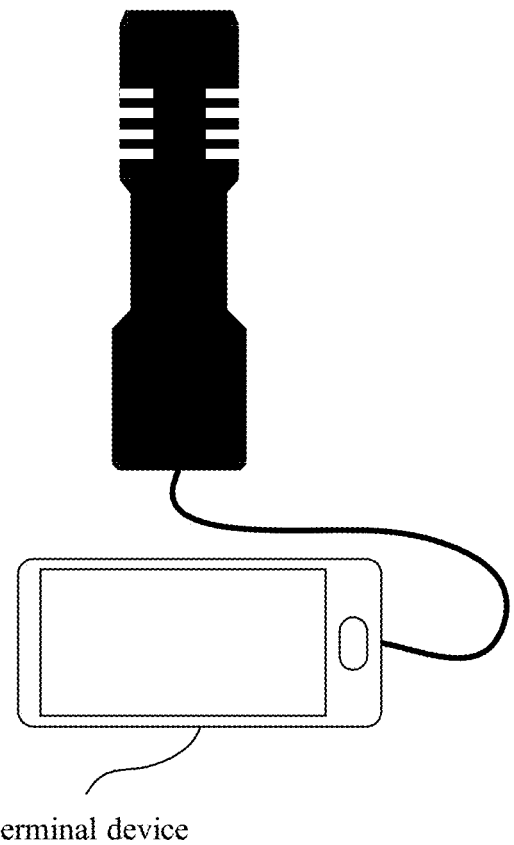
FIG. 2B is a schematic diagram of use of the recording device shown in FIG. 2A.

In some solutions, some additionally purchased external specialized recording accessories are usually used, for example, as shown in FIG. 2A. This type of specialized recording accessory is connected to the terminal device in a wired connection manner, and sends an audio data stream to the terminal device. In addition, this type of specialized recording accessory may be controlled by the terminal device. For example, the connection manner is shown in FIG. 2B. It can be seen that a specialized recording device shown in FIG. 2A is connected to a lower terminal device in a wired connection manner. In this case, an application (application, APP) matching the specialized recording device may run on the terminal device to perform recording. Certainly, information such as a waveform and a spectrum may be further displayed on the terminal device.

A size and performance indicator of a MIC component used in this type of specialized recording accessory are closely related. The concerned performance indicators include sensitivity, bandwidth, frequency response flatness, acoustic overload point, and the like. This type of specialized recording accessory usually uses a large-sized MIC component or a directional MIC component, and has a strong signal processing capability. This type of specialized recording accessory first processes audio data collected by a MIC inside the accessory, and then transmits the audio data to a connected terminal device through a universal serial bus (universal serial bus, USB) interface or another equivalent interface. The terminal device may further perform secondary processing on the processed audio data by using a signal processing algorithm, to implement diversified recording functions.

However, for the foregoing solution, because a size of the specialized recording device is large, portability is poor. The device needs to be connected to the terminal device during use, and parameters such as a direction and a gain of the MIC need to be manually adjusted by using the terminal device. The MIC needs to be removed after use. Consequently, an operation process is excessively cumbersome. In addition, when a shooting distance is long or an environment is noisy, a recording effect is not quite good. As a result, this type of device is applicable only to a professional user, and is not suitable for a common user.

Figure 3:
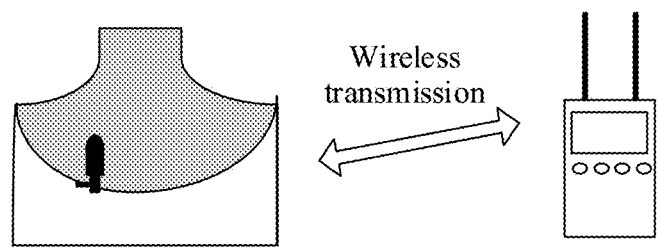
FIG. 3 is a schematic diagram of another specialized recording device.

In some other solutions, a wireless MIC solution is used, and the solution includes a transmitter and a receiver. The photographed object may wear the transmitter, for example, a lavalier MIC having a wireless function. In this case, the wireless lavalier MIC may be fastened to a collar of the photographed object, to pick up a human voice, for example, as shown in the left half part of FIG. 3. The receiver may be connected to the terminal device in a wired manner. In this solution, audio data is picked up by using the wireless lavalier MIC, and is transmitted to the receiver in a wireless manner. The receiver transmits the received audio data to a connected terminal device through a USB interface or another equivalent interface. Usually, one receiver may be connected to one to two transmitters.

However, in this solution, the wireless lavalier WC and the receiver have a single function and a large volume, and need to be purchased by a user separately. A wireless lavalier MIC and receiver with good performance usually price more than CNY 500, while more professional models price up to thousands of yuan. In addition, the receiver needs to be connected to the terminal device during use, and the receiver and the transmitter are removed after use. As a result, the receiver and the transmitter are applicable only to a professional user, and is not suitable for use by a common user anytime and anywhere.

Therefore, this application provides a method for changing a terminal device into a wireless recording MIC, including changing some terminal devices into transmitters and changing a terminal device into a receiver. When a user performs image shooting by using a terminal device, the user does not need to separately purchase another device, but can perform peripheral sound pickup by using another terminal device. A receiver sends a distributed recording instruction, to control one or more transmitters to perform recording, and send audio data obtained through recording to an upper-layer recording application. This ensures that a user can clearly record sound of a photographed object, a narration, and a commentary anytime and anywhere without a need to purchase any external device. Therefore, a professional recording effect is achieved.

The following describes in detail technical solutions in embodiments of this application with reference to the accompanying drawings in embodiments of this application.

Figure 4:
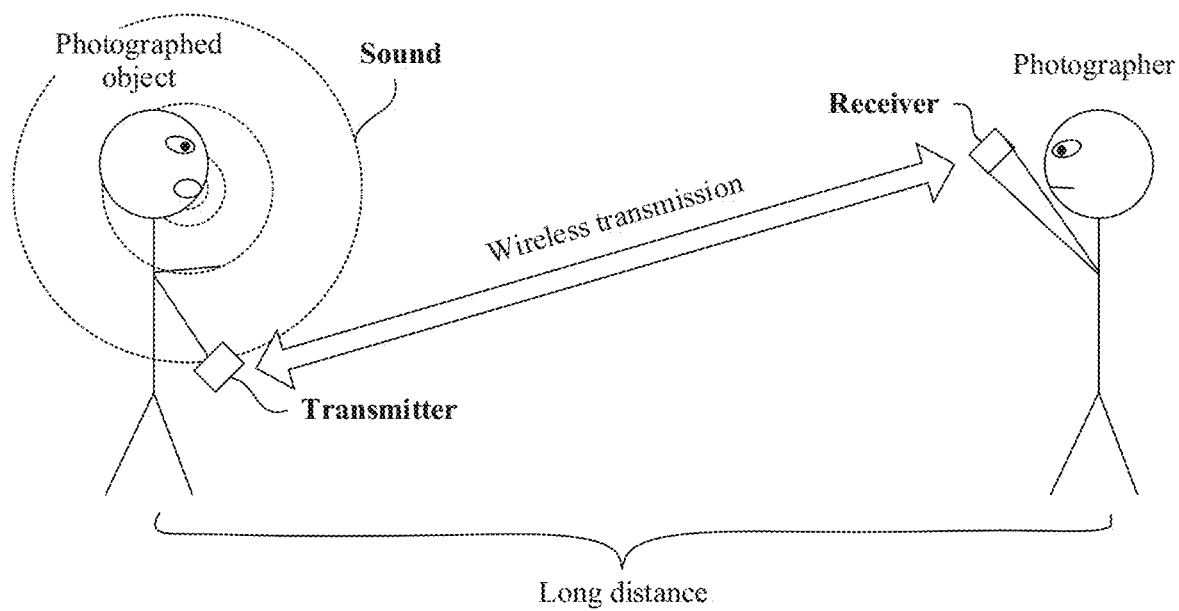
FIG. 4 is a schematic diagram of a one-to-one distributed recording scenario according to an embodiment of this application.

FIG. 4 is a schematic diagram of a one-to-one distributed recording scenario according to an embodiment of this application.

It can be learned that in this scenario, one receiver is used to match one transmitter. A photographer performs video shooting by using the receiver. In this case, the transmitter is located around a photographed object, to clearly pick up a sound of the photographed object. The receiver may be a first device, and the transmitter may be a second device. "First" and "second" in this application do not limit a sequence thereof, and are merely used to distinguish between different terminal devices.

It may be understood that the transmitter and the receiver in this application need to be pre-connected to a same wireless network environment, for example, access the same wireless network environment in any wireless transmission manner such as wireless fidelity (wireless fidelity, Wi-Fi), Bluetooth (Bluetooth, BT), and ZigBee (ZigBee). In other words, the transmitter and the receiver need to be located in a same wireless local area network.

Figure 5:
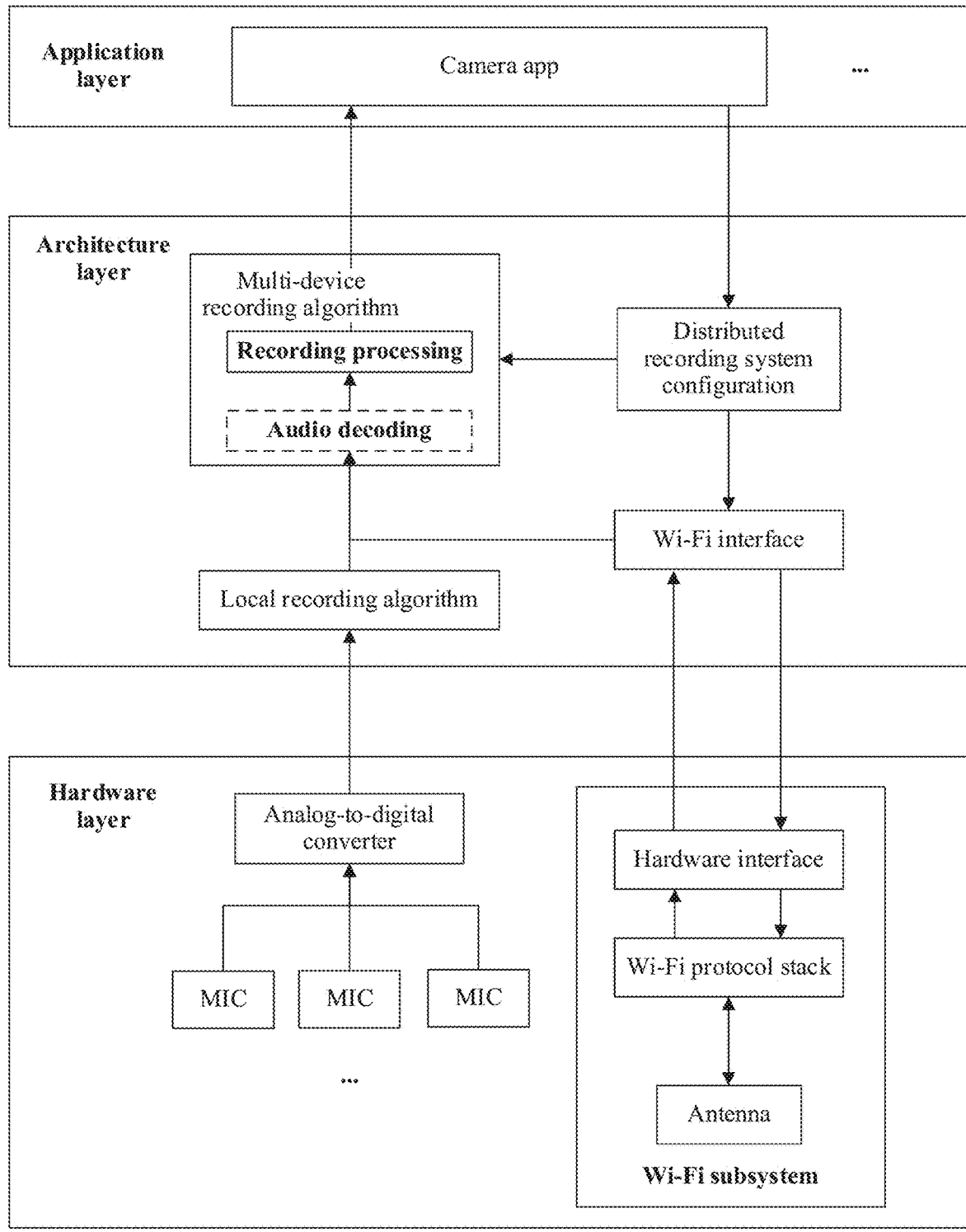
FIG. 5 is a schematic diagram of an architecture of a receiver according to an embodiment of this application.

In this scenario, this application provides a schematic diagram of an architecture of a receiver shown in FIG. 5.

It may be understood that the architecture of the receiver may be applied to a terminal device. The terminal device in this application may be but is not limited to any terminal device or portable terminal device such as a mobile phone, a television, a stereo, a wearable device, a tablet computer, a personal digital assistant (personal digital assistant, PDA), a laptop computer (laptop), a mobile computer, an augmented reality (augmented reality, AR) device, a virtual reality (virtual reality, VR) device, or an artificial intelligence (artificial intelligence, AI) device.

As shown in FIG. 5, the architecture of the receiver includes an app layer, a framework (framework) layer, and a hardware layer. The app layer includes a camera app, and certainly may further include any other possible app. This is not limited herein in this application.

In an example, this solution is described from a perspective of use by a user. For example, the user first selects a recording mode by using the receiver, for example, a distributed recording mode, a multi-device collaborative recording mode, or a local recording mode. After the user selects the distributed recording mode or the multi-device collaborative recording mode, the receiver may send a distributed recording request to a wireless network in which the receiver is located, for example, may send the distributed recording request in a broadcast manner. Then, when a transmitter located in a same wireless network receives the distributed recording request, a user of the transmitter may determine whether the transmitter is allowed to perform distributed recording or multi-device collaborative recording. After the user of the transmitter determines that the transmitter is allowed to perform distributed recording or multi-device collaborative recording, the transmitter may send a response message to a wireless network in which the transmitter is located, so that after receiving the response message, the receiver determines that the transmitter is allowed to perform recording. The foregoing process may be understood as a process in which the transmitter and the receiver determine each other. In this case, the receiver may determine one or more transmitters allowed to perform recording. The receiver may send a distributed recording start instruction or a multi-device collaborative recording start instruction, so that the one or more determined transmitters perform recording, and send recorded audio data to the receiver in a periodicity. When the periodicity is short, it may be considered that the transmitter sends the audio data in real time, and the receiver also receives the audio data in real time. After the receiver receives the audio data sent by the transmitter, the audio data may be invoked by an upper-layer camera app of the receiver. Certainly, the receiver may further upload the received audio data in real time, for example, upload the audio data to a server, to implement a function such as online live broadcast.

For example, in the scenario shown in FIG. 4, it is assumed that the photographer is ready to use the terminal device to perform image shooting or live broadcast for the photographed object. In this case, the terminal device used by the photographer may be referred to as a receiver. The photographer may first start a camera app on the receiver, and then tap, based on an interface displayed on the receiver, a distributed recording icon displayed on the interface, to select a corresponding recording mode. The recording mode may include distributed recording and local recording. Certainly, the distributed recording icon may alternatively be displayed in options of some setting menus, or the distributed recording icon may be displayed on some other possible user interfaces (user interfaces, UIs). The recording mode may include a distributed recording mode, a multi-device collaborative recording mode, and a local recording mode. In an example, if the photographer does not tap the distributed recording icon to select a recording mode, the camera app may select the local recording mode as a default recording mode.

Figure 6:
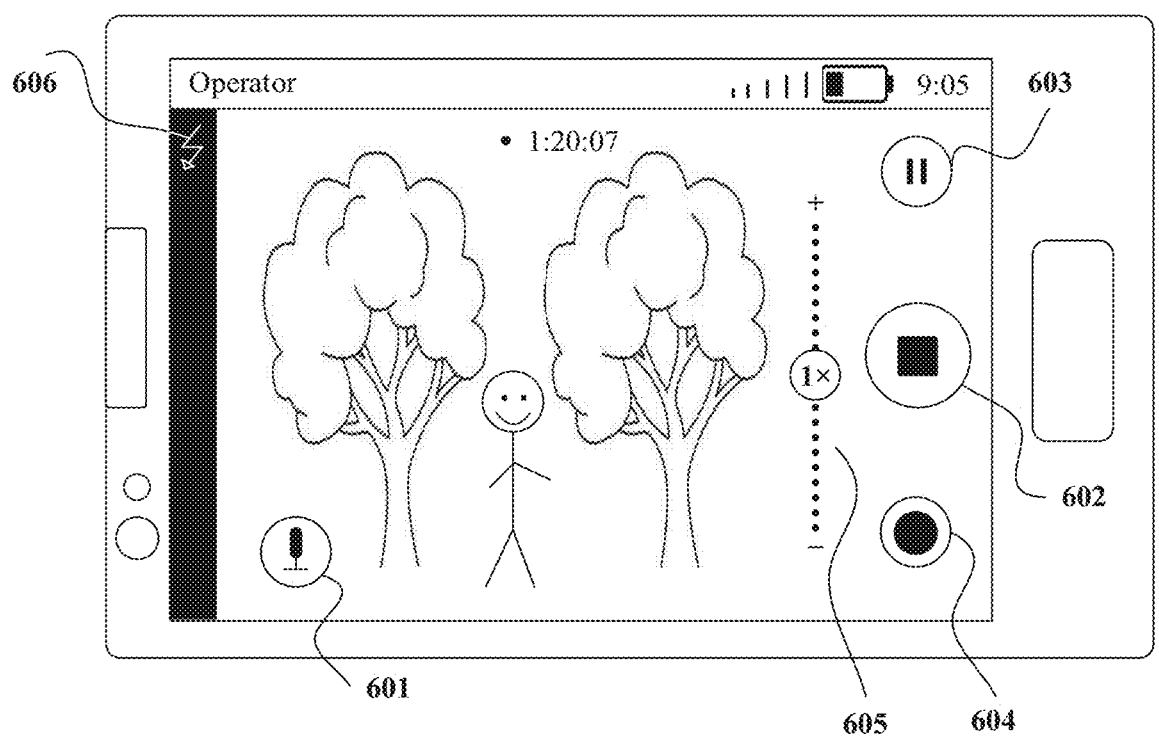
FIG. 6 is a schematic diagram of an image shooting interface of a terminal device according to an embodiment of this application.

Specifically, FIG. 6 is a schematic diagram of an image shooting interface of a terminal device. It can be learned that the interface is a display interface on which the user performs image shooting or live broadcast by using the camera app on the receiver. In an image shooting or live broadcast process, the photographer may select a recording mode by using a distributed recording icon 601 on a lower left side of the interface. Certainly, it may be understood that an action of selecting a recording mode by using the distributed recording icon 601 may also be performed before image shooting or live broadcast. In other words, the photographer may select a corresponding recording mode in advance by using the distributed recording icon 601, and then perform image shooting or live broadcast. The photographer may tap the distributed recording icon 601, to implement switching between different recording modes. For example, in the scenario in FIG. 4, the photographer may select the distributed recording mode by tapping the distributed recording icon 601. Only one transmitter and one receiver are included in this scenario. Therefore, in this scenario, the distributed recording mode may be a first distributed recording sub-mode, which is used to indicate that the transmitter and the receiver are connected in a wireless manner, and perform distributed recording.

Certainly, the image shooting interface shown in FIG. 6 may further include a button 602 for starting/stopping video recording, a button 603 for pausing video recording, a button 604 for shooting a frame of picture in video recording, a slider bar 605 for adjusting a picture size, and a button 606 for controlling a flash to be turned on. Certainly, the interface may further include video recording duration and a taskbar located on an upper part of the interface. The taskbar may include information such as an operator, Wi-Fi, a battery level, and time. Certainly, the taskbar may further include another possible icon or information. This is not limited herein in this application. In addition, the image shooting interface may further include any icon that has some specific functions other than the icons shown in the figure. It may be understood that FIG. 6 shows only a possible form of the image shooting interface. Styles of the distributed recording icon and other icons may be randomly designed based on an actual situation. This is not limited herein in this application.

Return to FIG. 5. When the user selects the distributed recording mode by using the camera app to perform video recording and audio recording, the camera app sends a mode selection instruction to a distributed recording system configuration module at the framework layer. The mode selection instruction may be a first instruction used to notify the distributed recording system configuration module that the user selects the distributed recording mode.

When the camera app sends the first instruction, after receiving the first instruction, the distributed recording system configuration module may determine that the recording mode selected by the photographer is the distributed recording mode. Then, the distributed recording system configuration module generates a distributed recording request according to the first instruction, and sends the distributed recording request to a Wi-Fi interface. After receiving the distributed recording request, the Wi-Fi interface forwards the request to a Wi-Fi subsystem at the hardware layer, and sends the request to one or more transmitters around the photographed object by using the Wi-Fi subsystem. It may be understood that the Wi-Fi interface is a software interface abstracted from the framework layer. The Wi-Fi subsystem may include a hardware interface, a Wi-Fi protocol stack, and an antenna. The Wi-Fi protocol stack in this application may be a Wi-Fi protocol stack materialized by hardware, and is configured to perform corresponding processing on data, so that processed data meets a Wi-Fi protocol format. More specifically, the Wi-Fi interface forwards the distributed recording request to the hardware interface at the hardware layer. After receiving the distributed recording request, the hardware interface forwards the distributed recording request to the protocol stack, performs corresponding processing on the distributed recording request in the Wi-Fi protocol stack, and sends the distributed recording request to the transmitter through the antenna. It may be understood that, for a specific manner of performing corresponding processing on the distributed recording request in the protocol stack, refer to a currently known technology. For ease of description, details are not described herein again.

After receiving the first instruction, the distributed recording system configuration module may further generate a distributed recording instruction, and send the distributed recording instruction to a multi-device recording algorithm module. The multi-device recording algorithm module is configured to: receive audio data from different terminal devices, perform operations such as audio decompression, recording processing, and time alignment on one or more pieces of received audio data, and send processed audio data to the camera app at the application layer. Before processing the audio data, the multi-machine recording algorithm module may perform configuration according to the instruction sent by the distributed recording system configuration module. For example, after receiving the distributed recording instruction, the multi-device recording algorithm module performs configuration according to the distributed recording instruction, and selects an output of the Wi-Fi interface as an input of an audio data stream, but does not use an output of the local recording algorithm module as an input.

After sending the distributed recording request, the Wi-Fi subsystem of the receiver may further receive a distributed recording response message sent by the one or more transmitters. Certainly, in the scenario shown in FIG. 4, only the distributed recording response message sent by one transmitter may be received. In this case, the distributed recording scenario is a distributed recording scenario in which one transmitter and one receiver are used. Specifically, a distributed recording response message sent by a specific transmitter may be received through the antenna. After receiving the distributed recording response message, the antenna may perform corresponding processing on the received distributed recording response message by using the Wi-Fi protocol stack, and then transmit a processed distributed recording response message to the Wi-Fi interface at the framework layer through the hardware interface. It may be understood that, for a specific manner of performing corresponding processing on the received audio data in the Wi-Fi protocol stack, refer to a currently known technology. For ease of description, details are not described herein again. The Wi-Fi interface sends the distributed recording response message to the distributed recording system configuration module, so that the distributed recording system configuration module may determine, based on the distributed recording response message, which transmitters are allowed to perform distributed recording.

After the distributed recording system configuration module determines, based on the distributed recording response message, that a specific transmitter is allowed to perform distributed recording, the distributed recording system configuration module generates a distributed recording start instruction, and sends the distributed recording start instruction to the Wi-Fi interface. In an example, the generated distributed recording start instruction may be prompt information sent by the receiver by using a display, so that the user can determine, based on the prompt information, whether to immediately start distributed recording. After receiving an operation instruction indicating that the user chooses to immediately start distributed recording, the receiver may control the distributed recording system configuration module to generate the distributed recording start instruction. Certainly, in another example, after determining, based on the distributed recording response message, that a specific transmitter is allowed to perform distributed recording, the distributed recording system configuration module of the receiver may actively generate the distributed recording start instruction. In still another example, after determining, based on the distributed recording response message, that a specific transmitter is allowed to perform distributed recording, the distributed recording system configuration module of the receiver may further receive an operation instruction, actively triggered by the user, for immediately starting distributed recording. It may be understood that, in this example, the receiver may not prompt the user whether to immediately start the distributed recording, but the user actively provides, by using a physical or virtual button on a touchscreen, the operation instruction for starting the distributed recording. After receiving the distributed recording start instruction, the Wi-Fi interface forwards the distributed recording start instruction to the Wi-Fi subsystem at the hardware layer, and sends, by using the Wi-Fi subsystem, the distributed recording start instruction to the transmitter allowed to perform distributed recording. It may be understood that a process of sending the distributed recording start instruction is the same as a process of sending the distributed recording request. For ease of description, details are not described herein again.

After sending the distributed recording start instruction, the Wi-Fi subsystem of the receiver may further receive audio data sent by the transmitter allowed to perform distributed recording. Specifically, the audio data sent by the transmitter may be received through the antenna. Then, after receiving the audio data, the antenna may perform corresponding processing on the received audio data by using the Wi-Fi protocol stack, and then transmit processed audio data to the Wi-Fi interface at the framework layer through the hardware interface. It may be understood that, for a specific manner of performing corresponding processing on the received audio data in the Wi-Fi protocol stack, refer to a currently known technology. For ease of description, details are not described herein again.

After receiving the processed audio data, the Wi-Fi interface at the framework layer directly forwards the audio data to the multi-device recording algorithm module, so that one or more submodules in the multi-device recording algorithm module process the received audio data. In an example, if the audio data sent by the transmitter is compressed audio data, an audio decoding submodule in the multi-device recording algorithm module may first decompress the compressed audio data, to obtain original audio data, and then perform recording processing on the obtained original audio data by using a recording processing submodule. It may be understood that a process of compressing the audio data may also be considered as a process of encoding the audio data. Similarly, a process of decompressing the compressed audio data may also be considered as a decoding process. The recording processing may include noise reduction, human voice enhancement, and another possible operation performed on the audio data. The multi-device recording algorithm module directly sends audio data obtained after recording processing to the camera app at the application layer. In an example, after performing recording processing on the audio data, the multi-device recording algorithm module may send the audio data obtained after recording processing to the camera app at the application layer by using an audio record source (audio record source) interface, to facilitate the camera app to use the audio data. For example, the audio data and a photographed picture are combined into a video file, or the audio data and the photographed picture are combined into a video file and then the video file is forwarded to another terminal device in an existing manner, to implement video live broadcast. Certainly, the receiver and the transmitter are connected in a same wireless local area network by using Wi-Fi. Therefore, in this case, the receiver may transmit the synthesized video file to a server or directly transmit the synthesized video file to another terminal device in another network connection manner, for example, by using a cellular network, Bluetooth, or ZigBee. Certainly, if a Wi-Fi direct (direct) technology is used, it is assumed that the receiver and the transmitter perform Wi-Fi interconnection by using a 2.4 GHz frequency band, the receiver may further implement data exchange with a wide area network by using a 5 GHz frequency band. It may be understood that, if the receiver and the transmitter are connected in another wireless manner such as Bluetooth or ZigBee, the receiver may be directly connected to the wide area network by using Wi-Fi in the 2.4 GHz frequency band or the 5 GHz frequency band.

It may be understood that the audio decoding submodule is used as an optional submodule. If compression processing is not performed on the audio data sent by the transmitter, recording processing may be directly performed on the audio data by using the recording processing submodule.

In another example, the mode selection instruction that is sent by the camera app and that is received by the distributed recording system configuration module may further be a second instruction used to notify the distributed recording system configuration module that the user selects the local recording mode.

When the camera app sends the second instruction, after receiving the second instruction, the distributed recording system configuration module may determine that the recording mode selected by the photographer is the local recording mode. Then, the distributed recording system configuration module may further generate a local recording instruction according to the second instruction, and send the local recording instruction to the multi-device recording algorithm module. For example, after receiving the local recording instruction, the multi-device recording algorithm module performs configuration according to the local recording instruction, and selects the output of the local recording algorithm module as the input of the audio data stream.

If the photographer selects the local recording mode, the camera app may directly send a local recording control instruction to the local recording algorithm module by using a set parameter (set parameter) interface, so that the local algorithm module controls one or more MICs at the hardware layer to collect an analog signal of the audio data. The local recording control instruction may be of a length of one byte. After receiving the local recording control instruction, the local recording algorithm module may control all MICs on the receiver to collect the audio data. Generally, where are two to four MICs, for example, three MICs in an example. Certainly, the local recording algorithm module may further control the MIC on the receiver to adjust a sound pickup range, noise intensity, and the like according to the local recording control instruction. For example, after multi-microphone directional noise reduction, a sound pickup range may be greater than 3 meters. The MIC converts the collected analog signal into a digital signal by using an analog-to-digital converter, and then transmits the digital signal of the audio data to the local recording algorithm module at the framework layer for corresponding processing. The local recording algorithm module may perform processing, for example, any possible processing manner of one or a combination of several of pre-emphasis, filtering, reverberation, and the like, on the digital signal of the audio data. The local recording algorithm module may transmit the audio data to the multi-device recording algorithm module by using an audio channel established between the local recording algorithm module and the multi-device recording algorithm module. In this case, the multi-device recording algorithm module does not have any function, and is only configured to forward the audio data to the camera app at the app layer. In an example, the analog-to-digital converter may convert the collected analog signal into a digital signal by using a coder-decoder (coder-decoder, Codec). It may be understood that, unless otherwise specified in this application, the audio data is a digital signal of the audio data.

It may be understood that, if the user does not select a recording mode, the multi-device recording algorithm module selects the output of the local recording algorithm module as the default input of the audio data stream.

Figure 7:
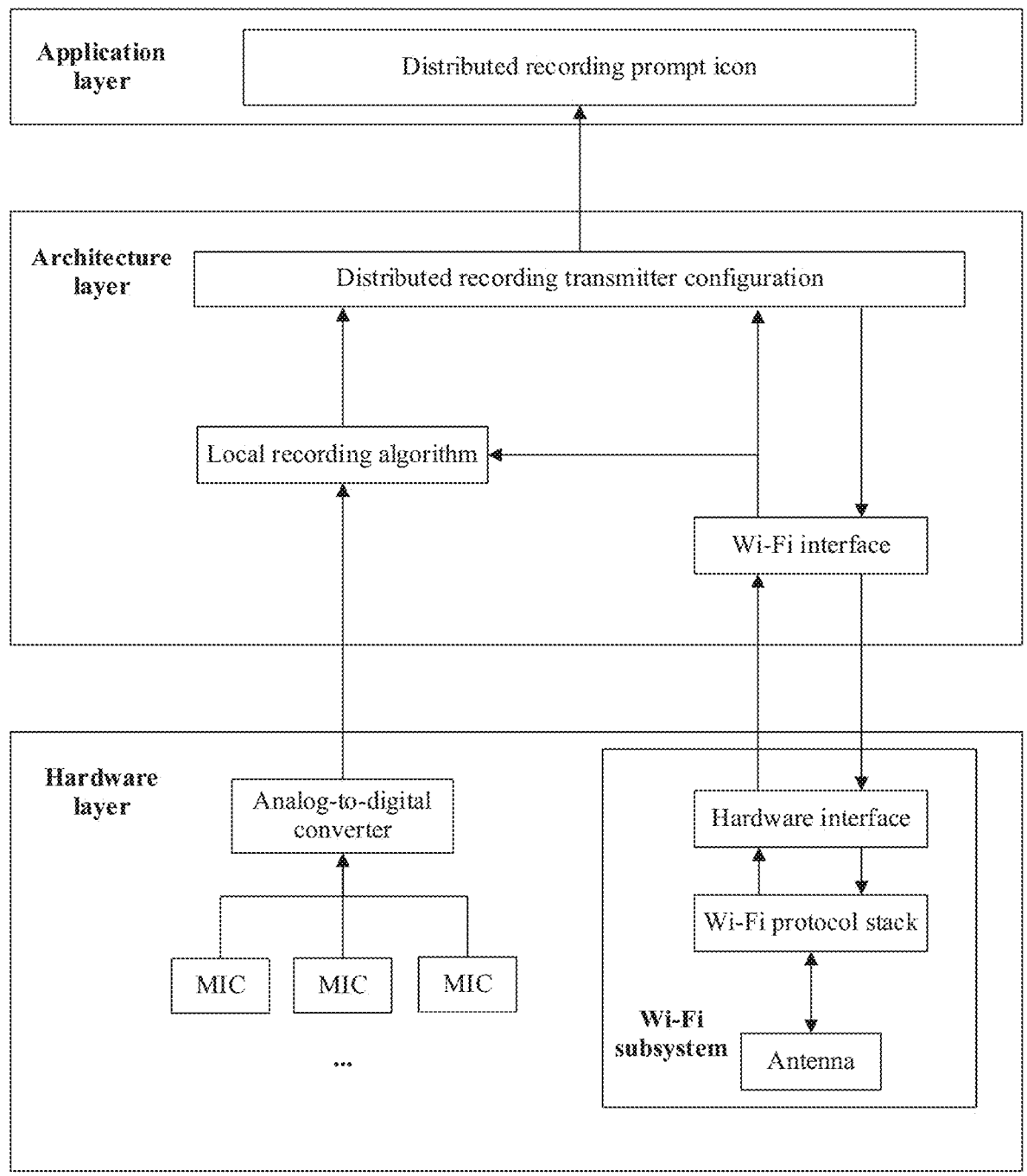
FIG. 7 is a schematic diagram of an architecture of a transmitter according to an embodiment of this application.

Corresponding to the receiver in the scenario shown in FIG. 4, this application further provides a schematic diagram of an architecture of a transmitter shown in FIG. 7.

It may be understood that the architecture of the transmitter may be applied to a terminal device. The terminal device may be but is not limited to any terminal device or portable terminal device such as a mobile phone, a wearable device, a tablet computer, a PDA, a laptop computer, a mobile computer, an AR device, a VR device, or an AI device.

Figure 8:
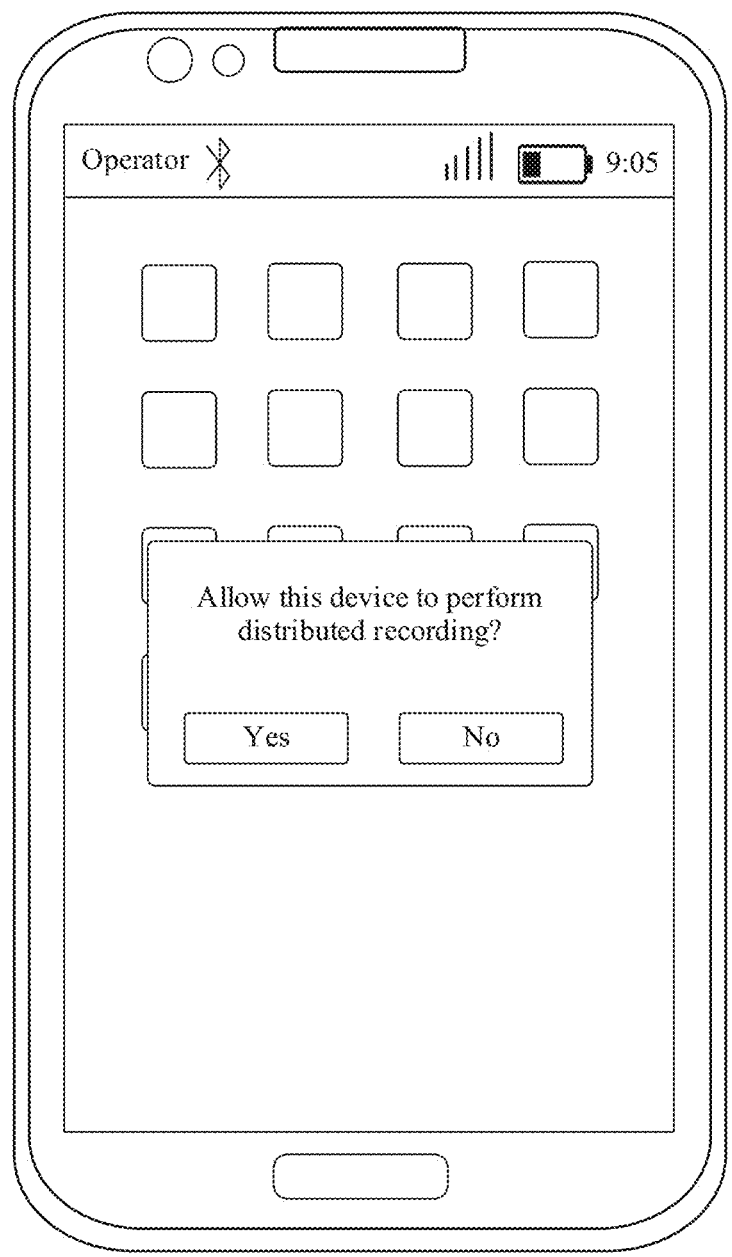
FIG. 8 is a schematic diagram of a prompt information display interface according to an embodiment of this application.

The architecture of the transmitter includes an app layer, a framework layer, and a hardware layer. First, a Wi-Fi subsystem located at the hardware layer may receive a distributed recording request sent by the receiver. Specifically, for example, the transmitter may receive, through an antenna, the distributed recording request sent by the receiver, and send the distributed recording request to a Wi-Fi protocol stack. Then, the Wi-Fi protocol stack forwards the distributed recording request to a Wi-Fi interface at the framework layer through a hardware interface. The Wi-Fi interface may forward the received distributed recording request to a distributed recording transmitter configuration module. After receiving the distributed recording request, the distributed recording transmitter configuration module may send prompt information to the app layer. The prompt information is displayed on a display, and is used to prompt the user whether to allow the terminal device to be used as a transmitter to perform distributed recording. For example, as shown in FIG. 8, it may be seen that a pop-up window used for prompting appears on the display interface. The pop-up window may include information such as a text, a graph, and a pattern, and is used to prompt the user whether to perform distributed recording. In addition, the pop-up window may include a selection button, for example, "Yes" and "No", to facilitate the user to make a selection. It may be understood that the user may be a photographer, a photographed object, or another user using the terminal device.

If the user chooses to allow the terminal device to be used as a transmitter to perform distributed recording, the app layer sends first information to the distributed recording transmitter configuration module at the framework layer based on an operation performed by the user on the display. The distributed recording transmitter configuration module may determine, based on the first information, that the terminal device is used as a transmitter, and generate the distributed recording response message. Then, the distributed recording transmitter configuration module sends the distributed recording response message to the Wi-Fi subsystem at the hardware layer through the Wi-Fi interface, and sends the distributed recording response message to the receiver by using the Wi-Fi subsystem, so that the receiver sends the distributed recording start instruction to the transmitter based on the distributed recording response message. Certainly, if the user chooses not to allow the terminal device to be used as a transmitter to perform distributed recording, the app layer sends second information to the distributed recording transmitter configuration module at the framework layer based on an operation performed by the user on the display. The distributed recording transmitter configuration module may determine, based on the second information, that the terminal device is not used as a transmitter, and generate the distributed recording response message.

The Wi-Fi subsystem of the transmitter may further receive the distributed recording start instruction sent by the receiver. Specifically, for example, the transmitter may receive, through the antenna, the distributed recording start instruction sent by the receiver, and send the distributed recording start instruction to the Wi-Fi protocol stack. Then, the Wi-Fi protocol stack forwards the distributed recording start instruction to the Wi-Fi interface at the framework layer through the hardware interface. The Wi-Fi interface may forward the received distributed recording start instruction to the distributed recording transmitter configuration module.

After receiving the distributed recording start instruction, the distributed recording transmitter configuration module may send the distributed recording start instruction to the local recording algorithm module through the setparameter interface. After receiving the distributed recording start instruction, the local recording algorithm module may adjust an algorithm parameter according to the distributed recording start instruction to meet a requirement of distributed recording. For example, the distributed recording start instruction may be of a length of one byte. After receiving the distributed recording start instruction, the local recording algorithm module may control some MICs on the receiver to collect the analog signal of the audio data. For example, one or two MICs may be controlled. If one MIC is controlled, the MIC may be a MIC located on the top of the terminal device. If two MICs are controlled, the MICs may be a MIC located on the top of the terminal device and a MIC located on the bottom of the terminal device. Certainly, the local recording algorithm module may further control the MIC on the receiver to adjust a sound pickup range, noise intensity, and the like according to the distributed recording start instruction. For example, after single-microphone noise reduction or dual-microphone noise reduction, a sound pickup range may be within 1 meter. After collecting the analog signal of the audio data, the MIC may send the analog signal of the audio data to the analog-to-digital converter, convert the collected analog signal into a digital signal, and then send the digital signal of local audio data to the local recording algorithm module. In this case, the local recording algorithm module may further perform processing, for example, any possible processing manner of one or a combination of several of pre-emphasis, filtering, reverberation, and the like, on the digital signal of the audio data. After processing, the digital signal of the audio data is sent to the distributed recording transmitter configuration module. Certainly, in some examples, the local recording algorithm module may further perform compression processing on the collected audio data, and then send compressed audio data to the distributed recording transmitter configuration module.

In an example, the transmitter may collect audio data in a periodicity. When the periodicity is short, for example, several milliseconds, several microseconds, or even several nanoseconds, it may be approximately considered that an audio signal is collected in real time. It may be understood that the transmitter may send, in the same periodicity, the audio signal collected in a periodicity. In other words, in one periodicity, the transmitter collects the audio signal and sends the audio signals to the receiver. The receiver may receive the audio signal based on the same periodicity.

If the transmitter is connected to a headset in a wired or wireless manner, the receiver may use the MIC of the headset for sound pickup. The photographed object may put the transmitter into another position such as a pocket or a clothes pocket. In this case, the transmitter can be used as "a wireless lavalier microphone".

After receiving the distributed recording start instruction, the distributed recording transmitter configuration module of the transmitter may send data related to the distributed recording prompt icon to the app layer, and display the distributed recording prompt icon at the app layer. For example, a taskbar above a display of the terminal device shown in FIG. 9 may further have a distributed recording prompt icon 801. The distributed recording prompt icon 801 is used to indicate that the terminal device, as a transmitter, enters the distributed recording mode, and is performing distributed recording. It may be understood that FIG. 9 merely shows a possible distributed recording prompt icon 801. A specific style and display location of the distributed recording prompt icon 801 may be randomly designed based on an actual situation. This is not limited herein in this application.

After receiving the audio data sent by the local recording algorithm module, the distributed recording transmitter configuration module may further send the received audio data to the Wi-Fi subsystem at the hardware layer through the Wi-Fi interface. The Wi-Fi subsystem may be further configured to send the audio data to the receiver, Specifically, for example, the Wi-Fi interface sends the audio data to the hardware interface located at the hardware layer, transmits the audio data to the Wi-Fi protocol stack through the hardware interface, and performs corresponding processing on the audio data in the Wi-Fi protocol stack. Then, the Wi-Fi protocol stack sends the processed audio data to the receiver through the antenna. It may be understood that, for a specific manner of performing corresponding processing on the audio data in the Wi-Fi protocol stack, refer to a currently known technology. For ease of description, details are not described herein again.

Figure 10:
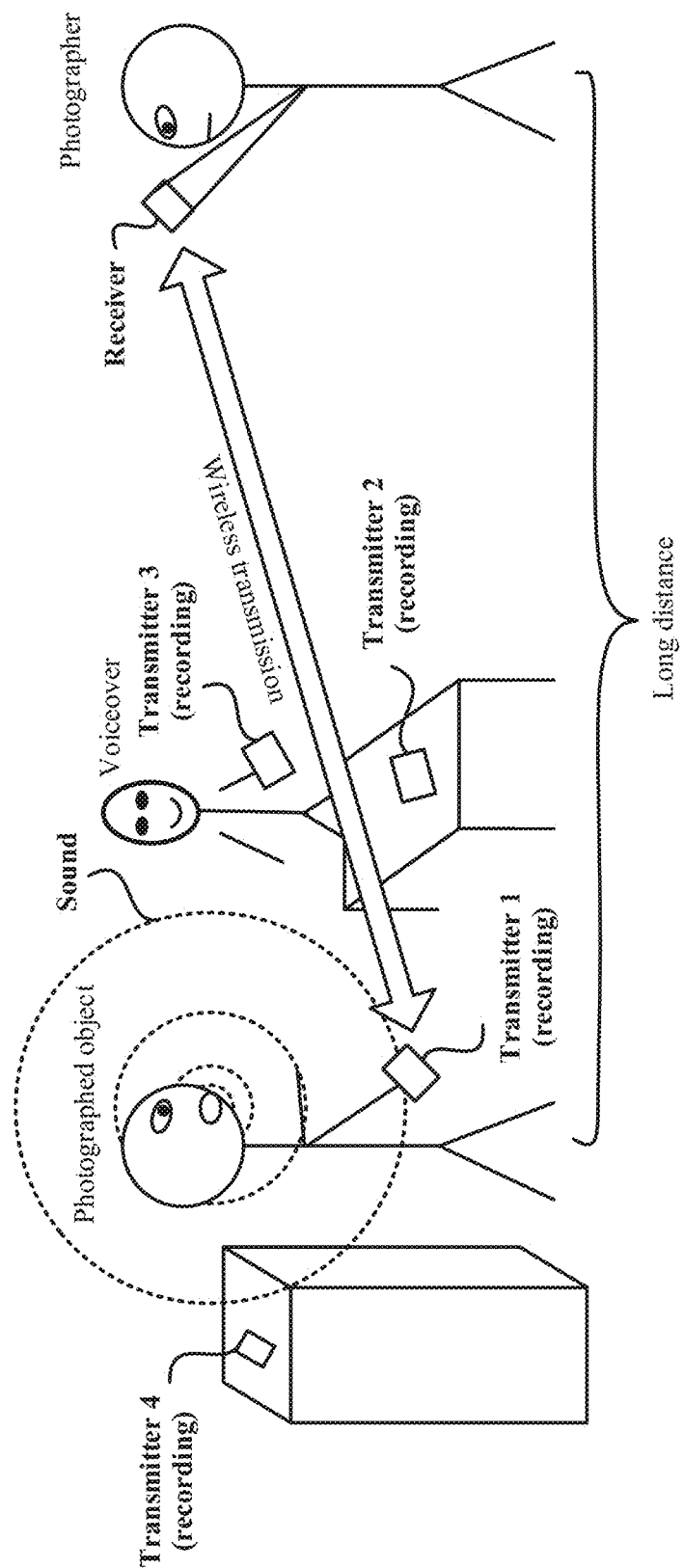
FIG. 10 is a schematic diagram of a one-to-many distributed recording scenario according to an embodiment of this application.

In another example, compared with the scenario shown in FIG. 4, the receiver may further receive the distributed recording response message sent by a plurality of transmitters, and control the plurality of transmitters to perform sound pickup. In this case, the distributed recording scenario is a distributed recording scenario in which a plurality of transmitters and one receiver are used. For example, as shown in FIG. 10, a photographer performs video shooting by using the receiver. In this case, a plurality of transmitters, for example, a transmitter 1, a transmitter 2, . . . , a transmitter N, may exist around a photographed object. N is a positive integer. Certainly, the transmitter may also be located at another location, for example, the transmitter 3 may be configured to record a narration or a commentary. Certainly, if there are a plurality of photographed objects, the transmitters may also be allocated to the plurality of photographed objects. The location of the transmitter is not specifically limited in this application. A plurality of transmitters and one receiver are included in this scenario, Therefore, in this scenario, the distributed recording mode may be a second distributed recording sub-mode, which is used to indicate that the plurality of transmitters and the receiver are connected in a wireless manner, and perform distributed recording.

Figure 9:
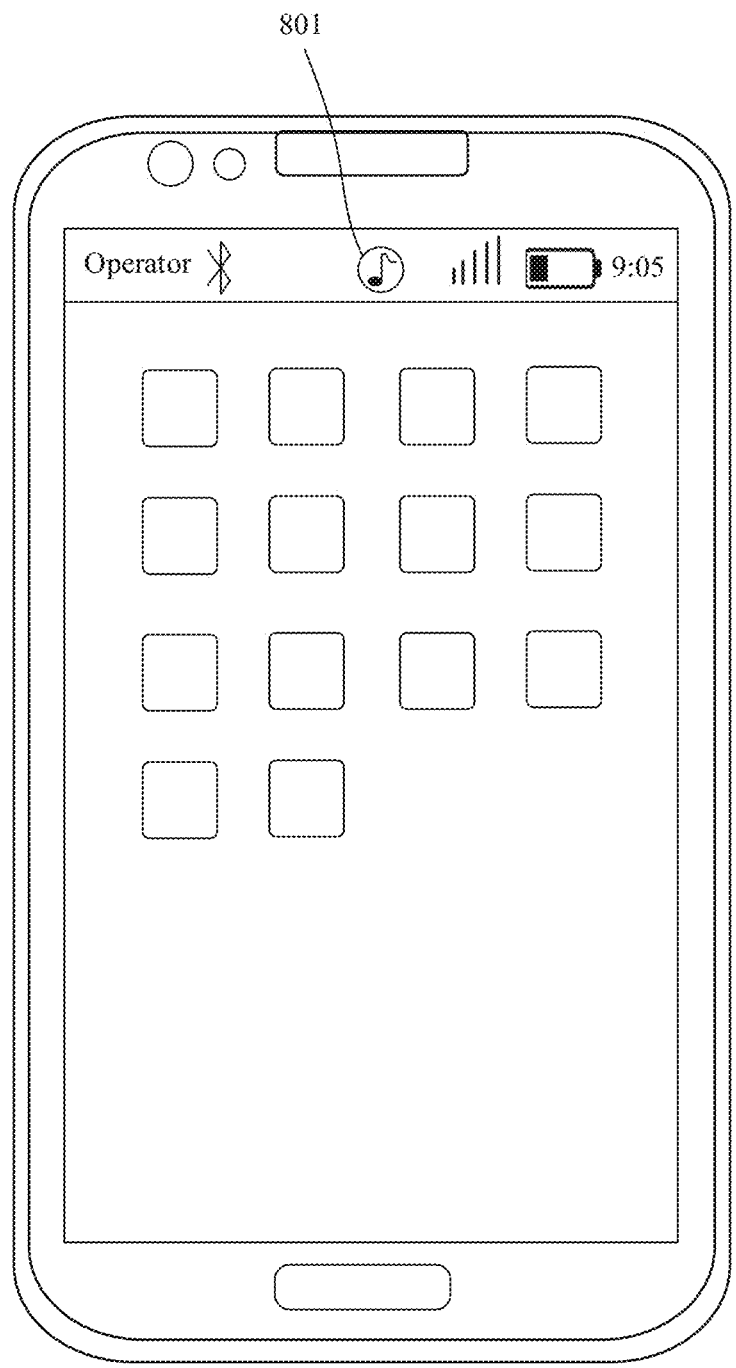
FIG. 9 is a schematic diagram of a distributed recording interface according to an embodiment of this application.

In the scenario shown in FIG. 10, the transmitter is the same as the transmitter shown in FIG. 7 and FIG. 9. For details, refer to corresponding descriptions. Details are not described herein again in this application. A difference between an architecture of the receiver and the architecture of the receiver shown in FIG. 5 only lies in the multi-device recording algorithm module.

Figure 11:
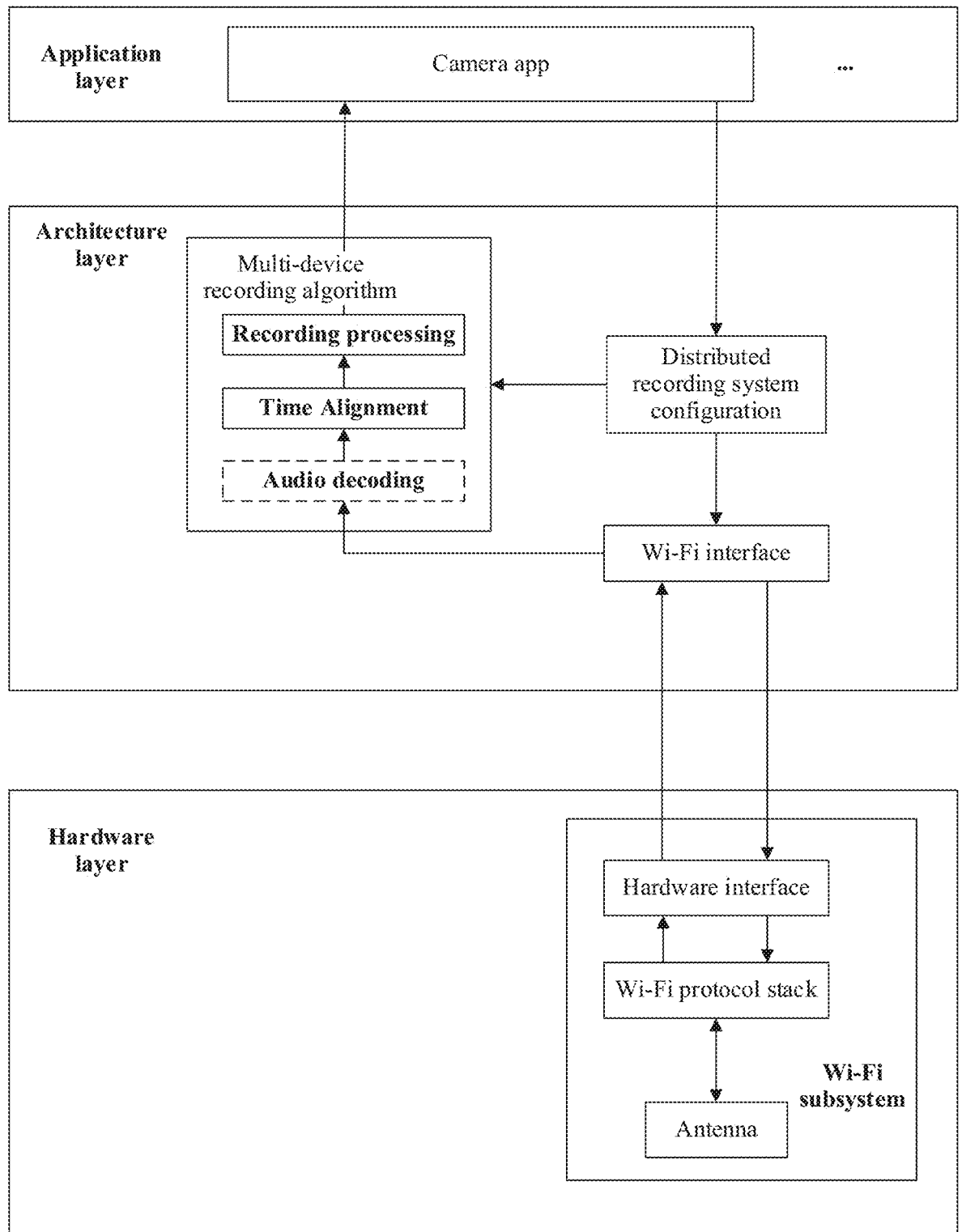
FIG. 11 is a schematic diagram of an architecture of another receiver according to an embodiment of this application.

FIG. 11 is a schematic diagram of an architecture of another receiver according to an embodiment of this application. Because the scenario in FIG. 10 is a distributed recording scenario one receiver and a plurality of transmitters are used, and a local recording mode is not involved, a local recording algorithm module and a corresponding analog-to-digital converter and a plurality of MICs are not shown in FIG. 11. For the receiver in the distributed recording scenario in which one receiver and a plurality of transmitters are used, after receiving the first instruction sent by the camera app, the distributed recording system configuration module of the receiver may transmit the distributed recording request to the Wi-Fi submodule at the hardware layer through the Wi-Fi interface, and send the distributed recording instruction to the plurality of transmitters by using the Wi-Fi submodule. After receiving the distributed recording response message sent by the plurality of transmitters, the distributed recording system configuration module may further transmit the distributed recording start instruction to the Wi-Fi submodule at the hardware layer through the Wi-Fi interface in a same manner, and send, by using the Wi-Fi submodule, the distributed recording start instruction to the plurality of transmitters allowed to perform distributed recording. Therefore, it is ensured that the plurality of transmitters can simultaneously send the collected audio data to the receiver. For a specific implementation, refer to corresponding descriptions in FIG. 5. Details are not described herein again.

If there are a plurality of transmitters allowed to perform distributed recording, the Wi-Fi submodule of the receiver may further receive the audio data sent by the plurality of transmitters, transmit a plurality of pieces of received audio data to the Wi-Fi interface at the framework layer, and transmit the plurality of pieces of received audio data to the multi-device recording algorithm module through the Wi-Fi interface. Because locations of the transmitters may be different, transmission time is different in a process of wirelessly transmitting audio data, and receiving time is certainly different. Therefore, for audio data received at different time, a time alignment submodule in the multi-device recording algorithm module may be used to perform time alignment on a plurality of pieces of audio data, so that a time sequence of the output audio data is correct, thereby avoiding mutual interference. For example, time alignment of the plurality of pieces of audio data may be implemented through corresponding detection and a delay buffer. A specific implementation may be an existing manner. Details are not described herein again. After time alignment is performed on the plurality of pieces of audio data, a recording processing submodule in the multi-device recording algorithm module is enabled to perform recording processing on the plurality of pieces of received audio data. For example, possible operations such as noise reduction, reverberation reduction, and human voice enhancement may be performed. For a specific implementation, refer to the descriptions of the corresponding part in FIG. 5. Details are not described herein again. Certainly, for the plurality of pieces of received audio data, if compressed audio data is received, an audio decoding submodule in the multi-device recording algorithm module may be further enabled to decompress the compressed audio data, to obtain original audio data. It should be noted that a sequence of performing time alignment and recording processing on the plurality of pieces of audio data may be adjusted based on an actual situation. For example, time alignment is first performed on the plurality of pieces of audio data and then recording processing is performed, or recording processing is first performed on the plurality of pieces of audio data and then time alignment is performed. However, it may be understood that, to avoid a time alignment problem caused by loss of some audio data during recording processing, generally, time alignment is first performed on the plurality of pieces of audio data and then recording processing is performed.

It may be understood that the camera app in FIG. 11 may also display the distributed recording icon on the display. A display manner of the distributed recording icon is totally the same as that of the distributed recording icon displayed by the camera app in FIG. 5. For details, refer to corresponding descriptions. Details are not described herein again.

Figure 12:
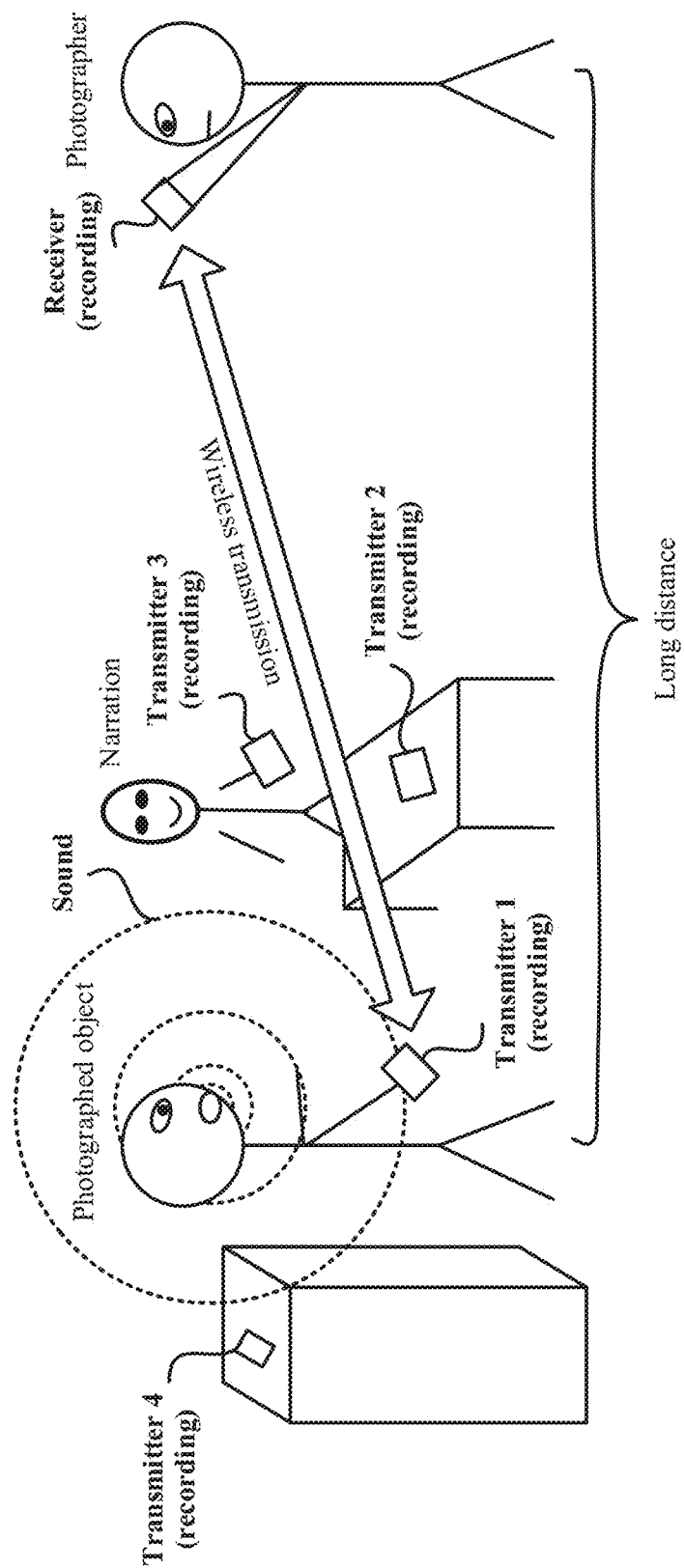
FIG. 12 is a schematic diagram of a multi-device collaborative distributed recording scenario according to an embodiment of this application.

FIG. 12 is a schematic diagram of a multi-device collaborative distributed recording scenario according to an embodiment of this application.

Compared with FIG. 10, in FIG. 12, the receiver used for video shooting also performs recording at the same time. Compared with FIG. 5, when the receiver used for video shooting performs recording, a plurality of transmitters also perform recording at the same time. It is clearly that, in the scenario shown in FIG. 12, the receiver and the plurality of transmitters collaboratively perform recording, to ensure that a sound of the photographed object, the narration, and the commentary can be clearly recorded.

Figure 13:
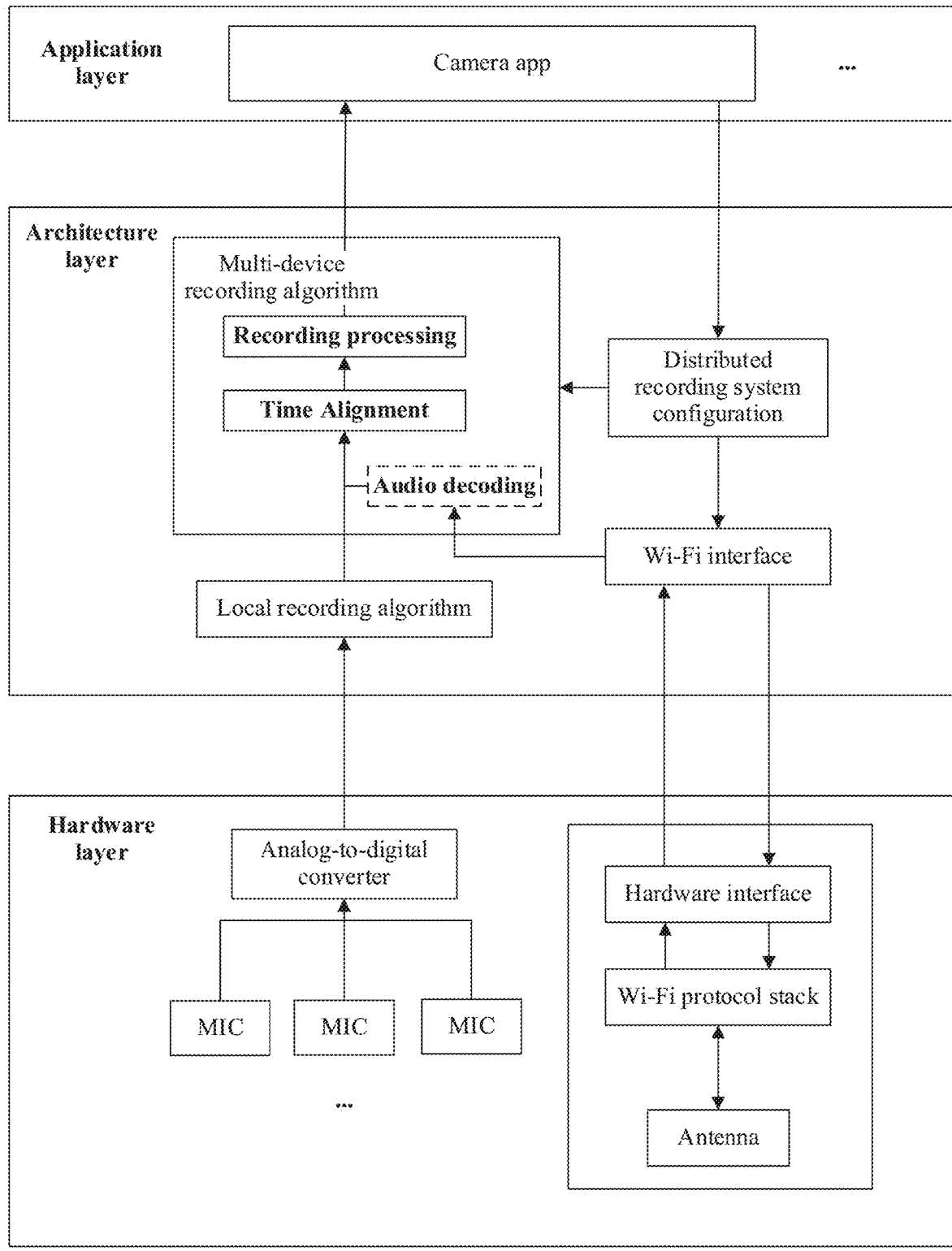
FIG. 13 is a schematic diagram of an architecture of still another receiver according to an embodiment of this application.

In this scenario, for example, as shown in FIG. 13, this application provides a schematic diagram of an architecture of still another receiver. The camera app may display the distributed recording icon on the display, so that the user can select different recording modes by using the distributed recording icon during use. The recording mode may include a distributed recording mode, a multi-device collaborative recording mode, and a local recording mode. A specific display manner of the distributed recording icon is totally the same as that of the distributed recording icon displayed by the camera app in FIG. 5. For details, refer to the corresponding descriptions. Details are not described herein again.

In an example, the mode selection instruction that is sent by the camera app and that is received by the distributed recording system configuration module may further be a third instruction used to notify the distributed recording system configuration module that the user selects the multi-device collaborative recording mode. After the distributed recording system configuration module at the framework layer receives the third instruction sent by the camera app, the distributed recording system configuration module may determine that the recording mode selected by the photographer is the multi-device collaborative recording mode. Then, the distributed recording system configuration module generates a distributed recording request according to the third instruction, and sends the distributed recording request to a Wi-Fi interface. After receiving the distributed recording request, the Wi-Fi interface forwards the distributed recording request to the Wi-Fi subsystem at the hardware layer, and sends the request to one or more transmitters around the photographed object by using the Wi-Fi subsystem. For a specific manner of sending the distributed recording request, refer to the corresponding descriptions in FIG. 5. Details are not described herein again. Certainly, in another example, the distributed recording system configuration module may generate a multi-device collaborative recording request according to the third instruction. It may be understood that action of the multi-device collaborative recording request is the same as a function of the foregoing distributed recording request.

In addition, after receiving the third instruction, the distributed recording system configuration module may further generate a multi-device collaborative recording instruction, and send the multi-device collaborative recording instruction to the multi-camera recording algorithm module. Before processing the audio data, the multi-camera recording algorithm module may perform configuration according to the instruction sent by the distributed recording system configuration module. For example, after receiving the multi-device collaborative recording instruction, the multi-camera recording algorithm module performs configuration according to the multi-device collaborative recording instruction, and selects the output of the Wi-Fi interface and the output of the local recording algorithm module as the input of the audio data stream.

If the photographer selects the multi-device collaborative recording mode, the camera app may directly send the local recording control instruction to the local recording algorithm module by using the setparameter interface, so that the local algorithm module controls the one or more MICs at the hardware layer to collect the analog signal of the audio data. A specific manner in which the local algorithm module runs is the same as the local recording mode. For details, refer to the corresponding descriptions in the local recording mode, Details are not described herein again.

After sending the distributed recording request, the Wi-Fi subsystem of the receiver may further receive the distributed recording response message sent by the one or more transmitters. Certainly, if the receiver sends the multi-device collaborative recording request, the receiver may receive a multi-device collaborative recording response message. It may be understood that functions of the multi-device collaborative recording response message are the same as those of the distributed recording response message. Subsequently, the distributed recording response message is used as an example for description. However, it may be conceived that the distributed recording response message may be replaced with the multi-device collaborative recording response message. In the scenario shown in FIG. 12, only the distributed recording response message sent by one transmitter may be received. In this case, the distributed recording scenario is a distributed recording scenario in which one transmitter and one receiver are used. Alternatively, the distributed recording response message sent by a plurality of transmitters may be received. In this case, the distributed recording scenario is a distributed recording scenario in which a plurality of transmitters and one receiver are used. Specifically, the distributed recording response message sent by the one or more transmitters may be received through the antenna. After receiving the distributed recording response message, the antenna may perform corresponding processing; on the received distributed recording response message by using the Wi-Fi protocol stack, and then transmit a processed distributed recording response message to the Wi-Fi interface at the framework layer through the hardware interface. It may be understood that, for a specific manner of performing corresponding processing on the received audio data in the Wi-Fi protocol stack, refer to a currently known technology. For ease of description, details are not described herein again. The Wi-Fi interface sends the distributed recording response message to the distributed recording system configuration module, so that the distributed recording system configuration module may determine, based on the distributed recording response message, which transmitters are allowed to perform distributed recording.

After the distributed recording system configuration module determines, based on the distributed recording response message, that the one or more transmitters are allowed to perform distributed recording, the distributed recording system configuration module generates the distributed recording start instruction, and sends the distributed recording start instruction to the Wi-Fi interface. After receiving the distributed recording start instruction, the Wi-Fi interface forwards the distributed recording start instruction to the subsystem at the hardware layer, and sends, by using the Wi-Fi subsystem, the distributed recording start instruction to the transmitter allowed to perform distributed recording. It may be understood that a process of sending the distributed recording start instruction is the same as a process of sending the distributed recording request. For ease of description, details are not described herein again. In another example, after the distributed recording system configuration module determines, based on the multi-device collaborative recording response message, that the one or more transmitters are allowed to perform distributed recording, the distributed recording system configuration module may further generate a multi-device collaborative recording start instruction. It may be understood that functions of the multi-device collaborative recording start instruction are totally the same as those of the distributed recording start instruction.

After sending the distributed recording start instruction (or the multi-device collaborative recording start instruction), the Wi-Fi subsystem of the receiver may further receive audio data sent by the transmitter allowed to perform distributed recording. For a specific manner, refer to the corresponding descriptions in the distributed recording mode. Details are not described herein again.

The multi-camera recording algorithm module in the multi-device collaborative recording mode has two input interfaces of the audio data at the same time. Therefore, the audio data stream input by the Wi-Fi interface and the audio data stream input by the local recording algorithm module may be input to the time alignment submodule simultaneously for time alignment. Certainly, if the audio data sent by the transmitter is compressed audio data, the audio decoding submodule in the multi-device recording algorithm module may first decompress the compressed audio data, to obtain original audio data, and then transmit the obtained original audio data to the time alignment submodule for time alignment. For a specific time alignment manner, refer to the descriptions of time alignment in the case of the plurality of transmitters in the distributed recording mode. Details are not described herein again. Audio data obtained after time alignment performed by the time alignment submodule may be sent to the recording processing submodule for recording processing. For a specific recording processing manner, refer to the corresponding descriptions in the foregoing distributed recording mode. Details are not described herein again. The multi-device recording algorithm module directly sends the audio data obtained after recording processing to the camera app at the application layer. It may be understood that, for a manner in which the multi-device recording algorithm module directly sends the audio data obtained after recording processing to the camera app at the application layer, refer to the corresponding descriptions in the distributed recording mode. Details are not described herein again. In addition, the audio decoding submodule is used as an optional submodule. If compression processing is not performed on the audio data sent by the transmitter, the audio data may be directly sent to the time alignment submodule for time alignment.

For the foregoing solutions in FIG. 5 to FIG. 13, only Wi-Fi is used as a possible manner. Certainly, any wireless transmission manner such as BT or ZigBee may be used for equivalent replacement. This is not limited herein in this application.

It may be understood that the terminal device may have both the architecture of the receiver and the architecture of the transmitter. The terminal device is selected as one of the receiver or the transmitter based on specific usage.

In still another example, the foregoing solutions in FIG. 5 to FIG. 13 may be understood as that the receiver and the transmitter are fixed in each use process. It may be understood that, in some cases, roles of the receiver and the transmitter are interchangeable. For example, the receiver may display, on the display, prompt information used for role exchange. The user may select, based on the prompt information, the receiver to exchange roles with the transmitter. The receiver may first determine which transmitters may also be used as the receiver, and display identifiers corresponding to the corresponding transmitters, so that the user selects, based on the displayed one or more transmitter identifiers, one of the transmitters to exchange roles with the receiver. After the roles are exchanged, the original transmitter serves as a new receiver to implement all functions of the receiver, and the original receiver serves as a new transmitter to implement all functions of the transmitter.

Figure 14:
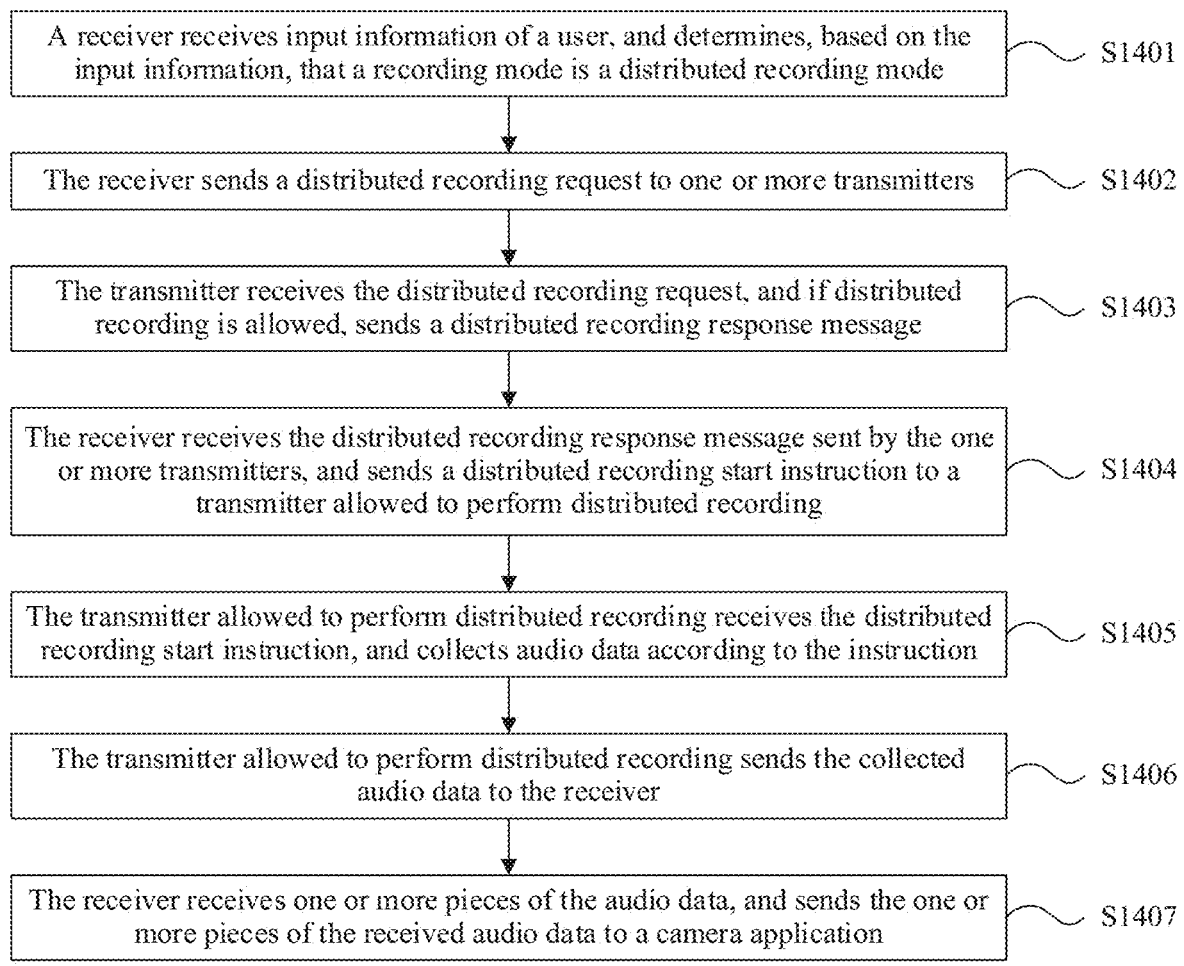
FIG. 14 is a flowchart of a distributed recording method according to an embodiment of this application.

FIG. 14 is a flowchart of a distributed recording method according to an embodiment of this application.

This application further provides a distributed recording method. The method may implement the foregoing solutions in FIG. 4 to FIG. 11. The method is mainly used in a distributed recording mode, and the method may include the following steps.

S1401: A receiver receives input information of a user, and determines, based on the input information, that a recording mode is a distributed recording mode.

S1402: The receiver sends a distributed recording request to one or more transmitters.

S1403: The transmitter receives the distributed recording request, and if distributed recording is allowed, sends a distributed recording response message.

S1404: The receiver receives the distributed recording response message sent by the one or more transmitters, and sends a distributed recording start instruction to a transmitter allowed to perform distributed recording.

S1405: The transmitter allowed to perform distributed recording receives the distributed recording start instruction, and collects audio data according to the instruction.

S1406: The transmitter allowed to perform distributed recording sends the collected audio data to the receiver.

S1407: The receiver receives one or more pieces of the audio data, and sends the received audio data to a camera application.

The method in FIG. 14 is mainly for a distributed recording scenario in which one transmitter and one receiver are used, and a distributed recording scenario in which a plurality of transmitters and one receiver are used. For a specific implementation process, refer to the foregoing solutions in FIG. 4 to FIG. 11. Details are not described herein again.

Figure 15:
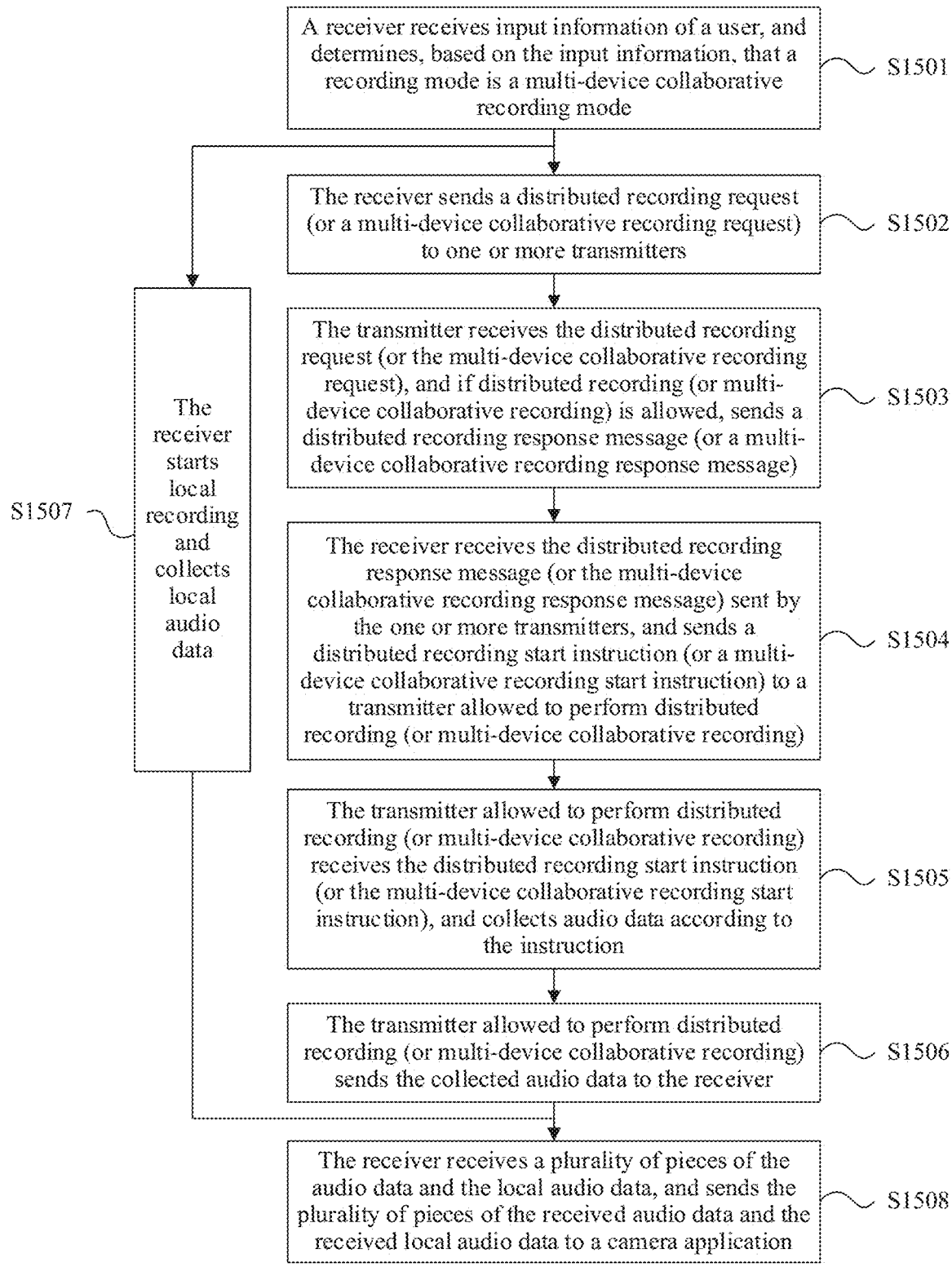
FIG. 15 is a flowchart of another distributed recording method according to an embodiment of this application.

FIG. 15 is a flowchart of another distributed recording method according to an embodiment of this application.

This application further provides another distributed recording method. The method may implement the foregoing solutions in FIG. 7 to FIG. 9, FIG. 12, and FIG. 13. The method is mainly used in a multi-device collaborative recording mode, and the method may include the following steps.

S1501: A receiver receives input information of a user, and determines, based on the input information, that a recording mode is a multi-device collaborative recording mode.

S1502: The receiver sends a distributed recording request (or a multi-device collaborative recording request) to one or more transmitters.

S1503: The transmitter receives the distributed recording request (or the multi-device collaborative recording request), and if distributed recording (or multi-device collaborative recording) is allowed, sends a distributed recording response message (or a multi-device collaborative recording response message).

S1504: The receiver receives the distributed recording response message or the multi-device collaborative recording response message) sent by the one or more transmitters, and sends a distributed recording start instruction (or a multi-device collaborative recording start instruction) to a transmitter allowed to perform distributed recording (or multi-device collaborative recording).

S1505: The transmitter allowed to perform distributed recording (or multi-device collaborative recording) receives a distributed recording start instruction (or a multi-device collaborative recording start instruction), and collects audio data according to the instruction.

S1506: The transmitter allowed to perform distributed recording (or multi-device collaborative recording) sends the collected audio data to the receiver.

It may be understood that when it is determined that the recording mode is the multi-device collaborative recording mode, S1507 may be further performed.

S1507: The receiver starts local recording and collects local audio data.

It should be noted that S1507 may be performed at any moment after S1501 and before S1508. This is not limited herein in this application.

S1508: The receiver receives a plurality of pieces of the audio data and the local audio data, and sends the plurality of pieces of the received audio data and the received local audio data to a camera application.

The method in FIG. 15 is mainly for a multi-device collaborative recording scenario in which one transmitter and one receiver are used, and a multi-device collaborative recording scenario in which a plurality of transmitters and one receiver are used. For a specific implementation process, refer to the foregoing solutions in FIG. 7 to FIG. 9, FIG. 12, and FIG. 13, Details are not described herein again.

Figure 16:
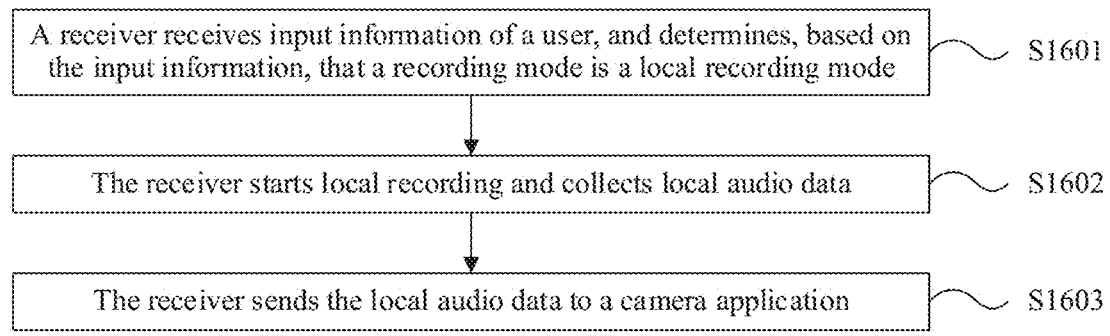
FIG. 16 is a flowchart of still another distributed recording method according to an embodiment of this application.

FIG. 16 is a flowchart of still another distributed recording method according to an embodiment of this application.

This application further provides still another distributed recording method. The method may implement the foregoing solutions in FIG. 4 to FIG. 11. The method is mainly used in a local recording mode, and the method may include the following steps.

S1601: A receiver receives input information of a user, and determines, based on the input information, that a recording mode is a local recording mode.

S1602: The receiver starts local recording and collects local audio data.

S1603: The receiver sends the local audio data to a camera application.

The method in FIG. 16 is mainly for a local recording scenario in which one receiver is used. For a specific implementation process, refer to the foregoing solutions in FIG. 4 to FIG. 11. Details are not described herein again.

Figure 17:
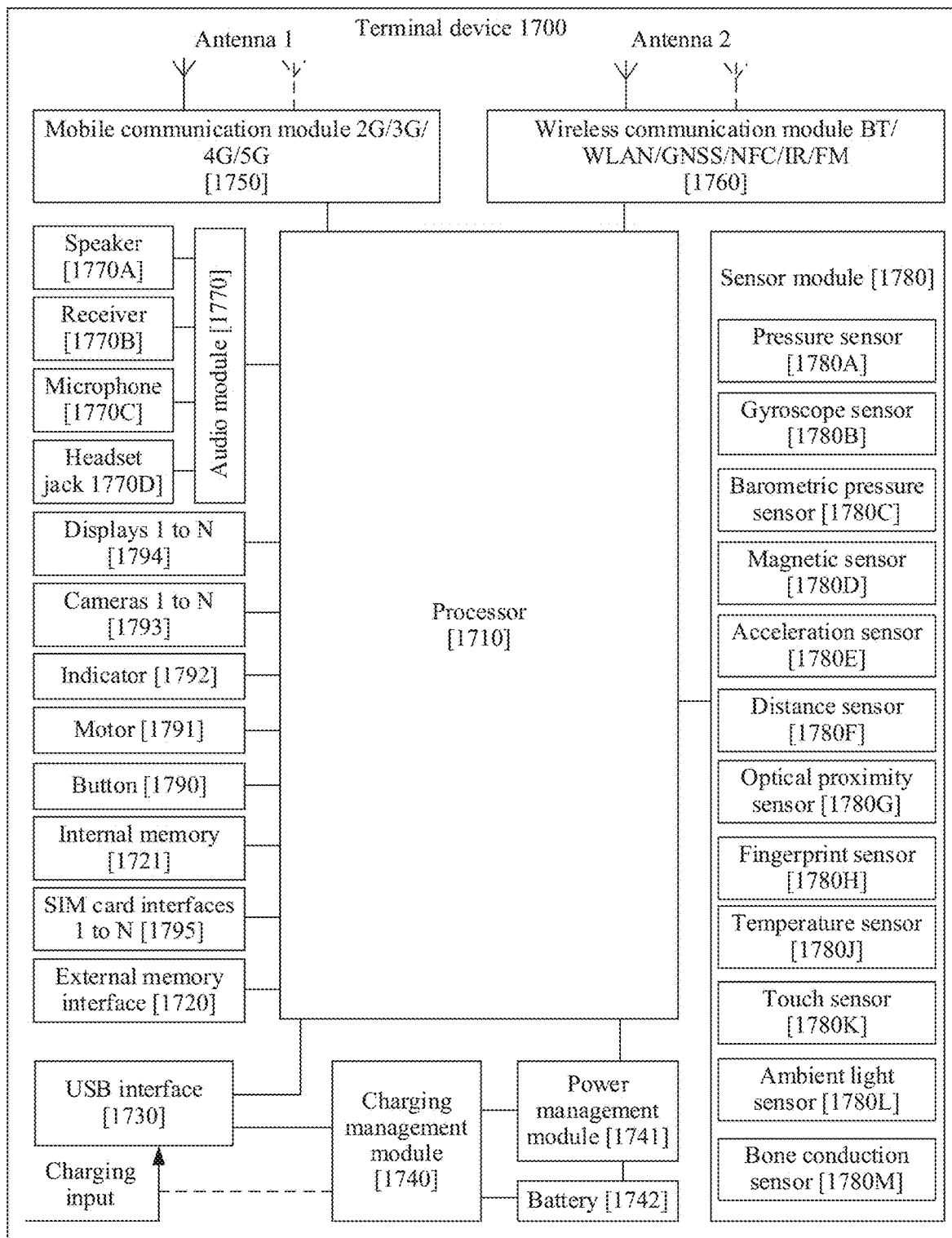
FIG. 17 is a schematic diagram of a distributed recording device according to an embodiment of this application.

FIG. 17 is a schematic diagram of a distributed recording device according to an embodiment of this application.

As shown in FIG. 17, a distributed recording device 1700 is provided. The device 1700 may be the transmitter or the receiver in the foregoing solutions in FIG. 4 to FIG. 13.

The device 1700 may include a processor 1710, an external memory interface 1720, an internal memory 1721, a universal serial bus (universal serial bus, USB) interface 1730, a charging management module 1740, a power management module 1741, a battery 1742, an antenna 1, an antenna 2, a mobile communication module 1750, a wireless communication module 1760, an audio module 1770, a speaker 1770A, a receiver 1770B, a microphone 1770C, a headset jack 1770D, a sensor module 1780, a button 1790, a motor 1791, an indicator 1792, a camera 1793, a display 1794, a subscriber identification module (subscriber identification module, SIM) card interface 1795, and the like. The sensor module 1780 may include a pressure sensor 1780A, a gyroscope sensor 1780B, a barometric pressure sensor 1780C, a magnetic sensor 1780D, an acceleration sensor 1780E, a distance sensor 1780I, an optical proximity sensor 1780G, a fingerprint sensor 1780H, a temperature sensor 1780J, a touch sensor 1780K, an ambient light sensor 1780L, a bone conduction sensor 1780M, and the like.

It can be understood that the structure shown in this embodiment of the present invention does not constitute a specific limitation on the distributed recording device 1700. In some other embodiments of this application, the distributed recording device 1700 may include more or fewer components than those shown in the figure, or combine some components, or split some components, or have different component arrangements. The components shown in the figure may be implemented by hardware, software, or a combination of software and hardware.

The processor 1710 may include one or more processing units. For example, the processor 1710 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may generate an operation control signal based on instruction operation code and a time sequence signal, to complete control of instruction fetching and instruction execution.

A memory may be further disposed in the processor 1710, and is configured to store instructions and data. In some embodiments, the memory in the processor 1710 is a cache memory. The memory may store instructions or data just used or cyclically used by the processor 1710. If the processor 1710 needs to use the instructions or the data again, the processor may directly invoke the instructions or the data from the memory. This avoids repeated access, reduces waiting time of the processor 1710, and improves system efficiency.

In some embodiments, the processor 1710 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The USB interface 1730 is an interface that conforms to a USB standard specification, and may be specifically a mini USB interface, a micro USB interface, a USB Type-C interface, or the like. The USB interface 1730 may be configured to connect to a charger to charge the distributed recording device 1700, or may be configured to transmit data between the distributed recording device 1700 and a peripheral device, or may be configured to connect to a headset for playing or collecting audio through the headset. The interface may be further configured to connect to another electronic device such as an AR device.

It may be understood that an interface connection relationship between the modules that is shown in this embodiment of the present invention is merely an example for description, and does not constitute a limitation on the structure of the distributed recording device 1700. In some other embodiments of this application, the distributed recording device 1700 may alternatively use an interface connection manner different from that in the foregoing embodiment, or a combination of a plurality of interface connection manners.

A wireless communication function of the distributed recording device 1700 may be implemented through the antenna 1, the antenna 2, the mobile communication module 1750, the wireless communication module 1760, the modem processor, the baseband processor, and the like.

The antenna 1 and the antenna 2 are configured to transmit and receive an electromagnetic wave signal. Each antenna in the distributed recording device 1700 may be configured to cover one or more communication bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communication module 1750 can provide a solution to wireless communication that is applied to the distributed recording device 1700 and that includes 2G/3G/4G/5G or the like. The mobile communication module 1750 may include at least one filter, a switch, a power amplifier, a low noise amplifier (low noise amplifier, LNA), and the like. The mobile communication module 1750 may receive an electromagnetic wave through the antenna 1, perform processing such as filtering or amplification on the received electromagnetic wave, and transmit the electromagnetic wave to the modem processor for demodulation. The mobile communication module 1750 may further amplify a signal modulated by the modem processor, and convert the signal into an electromagnetic wave for radiation through the antenna 1, in some embodiments, at least some function modules in the mobile communication module 1750 may be disposed in the processor 1710. In some embodiments, at least some function modules in the mobile communication module 1750 may be disposed in a same component as at least some modules in the processor 1710.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 1770A, the receiver 1770B, and the like), or displays an image or a video on the display 1794. In some embodiments, the modem processor may be an independent component, in some other embodiments, the modem processor may be independent of the processor 1710, and is disposed in a same component as the mobile communication module 1750 or another function module.

The wireless communication module 1760 may provide a wireless communication solution that is applied to the electronic device 1700 and that includes a wireless local area network (wireless local area network, WLAN) (for example, Wi-Fi network), Bluetooth, a global navigation satellite system (global navigation satellite system, GNSS), frequency modulation (frequency modulation, FM), a near field communication (near field communication, NFC) technology, an infrared (infrared, IR) technology, or the like. The wireless communication module 1760 may be one or more components integrating at least one communication processor module. The wireless communication module 1760 receives an electromagnetic wave through the antenna 2, performs frequency modulation and filtering processing on the electromagnetic wave signal, and sends a processed signal to the processor 1710. The wireless communication module 1760 may further receive a to-be-sent signal from the processor 1710, perform frequency modulation and amplification on the signal, and convert the signal into an electromagnetic wave for radiation through the antenna 2.

In some embodiments, in the distributed recording device 1700, the antenna 1 and the mobile communication module 1750 are coupled, and the antenna 2 and the wireless communication module 1760 are coupled, so that the distributed recording device 1700 can communicate with a network and another device by using a wireless communication technology.

The display 1794 is configured to display an image, a video, and the like. The display 1794 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the distributed recording device 1700 may include one or N displays 1794, where N is a positive integer greater than 1.

The distributed recording device 1700 may implement an image shooting function by using the ISP, the camera 1793, the video codec, the GPU, the display 1794, the application processor, and the like.

The camera 1793 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the distributed recording device 1700 may include one or M cameras 1793, where M is a positive integer greater than 1.

The external memory interface 1720 may be used to connect to an external memory card, for example, a micro SD card, to extend a storage capability of the distributed recording device 1700. The external storage card communicates with the processor 1710 through the external memory interface 1720, to implement a data storage function. For example, files such as music and videos are stored in the external storage card.

The internal memory 1721 may be configured to store computer-executable program code. The executable program code includes instructions. The internal memory 1721 may include a program storage area and a data storage area. The program storage area may store an operating system, an application required by at least one function (for example, a sound playing function or an image playing function), and the like. The data storage area may store data (for example, audio data) and the like created when the distributed recording device 1700 is used. In addition, the internal memory 1721 may include a high-speed random access memory, or may include a nonvolatile memory such as at least one disk storage device, a flash memory, or a universal flash storage (universal flash storage, UFS). The processor 1710 runs instructions stored in the internal memory 1721 and/or instructions stored in the memory disposed in the processor, to perform various function applications of the distributed recording device 1700 and data processing.

The distributed recording device 1700 may implement audio functions such as music playing and recording by using the audio module 1770, the speaker 1770A, the receiver 1770B, the microphone 1770C, the headset jack 1770D, the application processor, and the like.

The audio module 1770 is configured to convert digital audio information into an analog audio signal for output, and is also configured to convert an analog audio input into a digital audio signal. The audio module 1770 may further be configured to: code and decode the audio signal, for example, compress and decompress the audio signal. In some embodiments, the audio module 1770 may be disposed in the processor 1710, or some function modules in the audio module 1770 are disposed in the processor 1710, so that the processor processes the digital audio signal. In an example, the audio module 1770 may be, for example, a codec.

The microphone 1770C, also referred to as a "mike" or a "mic", is configured to convert a sound signal into an electrical signal. When recording is performed, a sound may be made near the microphone 1770C, so that a sound signal is input to the microphone 1770C. At least one microphone 1770C may be disposed in the distributed recording device 1700, for example, three to four microphones may be disposed. In some other embodiments, the distributed recording device 1700 may include two microphones 1770C, to collect a sound signal and implement a noise reduction function. In some other embodiments, three, four, or more microphones 1770C may alternatively be disposed in the distributed recording device 1700, to collect a sound signal, implement noise reduction, and identify a sound source, to implement a directional recording function and the like.

The headset jack 1770D is configured to connect to a wired headset. The headset jack 1770D may be a USB interface 1730, or may be a 3.5 mm open mobile terminal platform (open mobile terminal platform, OMTP) standard interface or cellular telecommunications industry association of the USA (cellular telecommunications industry association of the USA, CTIA) standard interface.

A software system of the distributed recording device 1700 may use a layered architecture, an event-driven architecture, a microkernel architecture, a microservice architecture, or a cloud architecture. In this embodiment of this application, an Android system of a layered architecture may be used.

The distributed recording device 1700 may perform any function of the transmitter or the receiver in FIG. 4 to FIG. 16. For details, refer to the descriptions in FIG. 4 to FIG. 16. Details are not described herein again.

In this application, the terminal device is used as the transmitter and the receiver. Because the terminal device has a high occasional recording degree and has a large market inventory, it is ensured that a user can clearly record a sound of a photographed object, a narration, and a commentary anytime and anywhere without a need to purchase any other external device, and can obtain a good recording effect.

A person of ordinary skill in the art may be further aware that, in combination with the examples described in embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

A person of ordinary skill in the art may understand that all or a part of the steps in each of the foregoing method of embodiments may be implemented by a program instructing a processor. The foregoing program may be stored in a computer-readable storage medium. The storage medium is a non-transitory (English: non-transitory) medium, for example, a random access memory, a read-only memory, a flash memory, a hard disk, a solid state drive, a magnetic tape (English: magnetic tape), a floppy disk (English: floppy disk), an optical disc (English: optical disc), or any combination thereof.

The foregoing descriptions are merely example specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A recording system, comprising:
   a first device configured to:
      receive input information of a user; and
      send a distributed recording start instruction when a recording mode corresponding to the input information is a distributed recording mode; and
   a second device configured to:
      receive, from the first device, the distributed recording start instruction;
      collect, according to the distributed recording start instruction, first audio data in a first periodicity, wherein the first audio data is first local audio data collected by the second device;
      perform human voice enhancement or noise reduction processing on the first audio data in a second periodicity to produce second audio data; and
      send the second audio data to the first device in the second periodicity to instruct the first device to invoke at least one piece of the second audio data with a camera application.

2. The recording system of claim 1, wherein the second device is further configured to collect, based on a recording parameter corresponding to the distributed recording start instruction, the first audio data.

3. The recording system of claim 1, wherein before the second device sends the second audio data, the second device is further configured to perform compression processing on the first audio data to obtain the second audio data.

4. The recording system of claim 1, wherein the first device is further configured to decompress the second audio data when the second audio data is compressed.

5. The recording system of claim 1, wherein when the distributed recording mode comprises a multi-device collaborative recording mode, the first device is further configured to:
   collect third audio data, wherein the third audio data is second local audio data collected by the first device; and
   invoke, by the camera application, the at least one piece and the third audio data.

6. The recording system of claim 1, wherein the first device is further configured to:
   perform a time alignment operation on a plurality of pieces of the second audio data when the second audio data comprises the plurality of pieces; and
   perform the time alignment operation on the at least one piece and third audio data collected by the first device when the recording mode is a multi-device collaborative recording mode.

7. The recording system of claim 5, wherein before the first device invokes the at least one piece and the third audio data, the first device is further configured to perform the human voice enhancement or the noise reduction processing on the third audio data.

8. The recording system of claim 1, wherein when the distributed recording mode comprises a first distributed recording sub-mode, the first device is further configured to:
send a distributed recording instruction to the second device; and
receive, from the second device, the second audio data, and
wherein when the distributed recording mode comprises a second distributed recording sub-mode, the first device is further configured to:
send the distributed recording instruction to the second device and a plurality of additional devices; and
receive, from the second device and the plurality of additional devices, the second audio data.

9. The recording system of claim 1, wherein before the first device sends the distributed recording start instruction, the first device is further configured to send a distributed recording request to the second device, wherein the second device is further configured to:
receive, from the first device, the distributed recording request;
display prompt information on a display of the second device, wherein the prompt information prompts whether to allow the second device to perform distributed recording; and
send a distributed recording response message to the first device, wherein the distributed recording response message indicates whether the second device is allowed to perform the distributed recording, and
wherein the first device is further configured to:
receive, from the second device, the distributed recording response message; and
send, in response to receiving the distributed recording response message, the distributed recording start instruction to the second device.

10. The recording system of claim 1, wherein the recording mode further comprises a local recording mode and a multi-device collaborative recording mode, wherein the distributed recording mode comprises a first distributed recording sub-mode and a second distributed recording sub-mode, and wherein the first device is further configured to perform switching, based on the input information, among the local recording mode, the first distributed recording sub-mode, the second distributed recording sub-mode, and the multi-device collaborative recording mode.

11. The recording system of claim 1, wherein the first device is further configured to display a distributed recording icon on a display of the first device.

12. The recording system of claim 1, wherein the second device is further configured to display a distributed recording prompt icon on a display of the second device.

13. A first device, comprising:
a memory configured to store instructions; and
one or more processors coupled to the memory and configured to execute the instructions to:
receive input information of a user;
send, to a second device, a distributed recording start instruction when a recording mode corresponding to the input information is a distributed recording mode;
receive, from the second device, first audio data;
invoke, by a camera application, at least one piece of the first audio data;
perform a time alignment operation on a plurality of pieces of the first audio data when the first audio data comprises the plurality of pieces; and
perform the time alignment operation on the first audio data and second audio data collected by the first device when the recording mode is a multi-device collaborative recording mode.

14. The first device of claim 13, wherein the one or more processors are further configured to execute the instructions to decompress the at least one piece when the at least one piece is compressed.

15. The first device of claim 13, wherein when the distributed recording mode comprises the multi-device collaborative recording mode, the one or more processors are further configured to execute the instructions to:
collect the second audio data, wherein the second audio data is local audio data collected by the first device; and
invoke, by the camera application, the at least one piece and the second audio data.

16. The first device of claim 15, wherein before invoking the at least one piece and the second audio data, the one or more processors are further configured to perform noise reduction or human voice enhancement on the second audio data.

17. The first device of claim 13, wherein when the distributed recording mode comprises a first distributed recording sub-mode, the one or more processors are further configured to execute the instructions to:
send a distributed recording instruction to the second device; and
receive, from the second device, the first audio data; and
wherein when the distributed recording mode comprises a second distributed recording sub-mode, the one or more processors are further configured to execute the instructions to:
send the distributed recording instruction to the second device and a plurality of additional devices; and
receive, from the second device and the plurality of additional devices, the first audio data.

18. A second device, comprising:
a memory configured to store instructions; and
one or more processors coupled to the memory and configured to execute the instructions to:
receive, from a first device, a distributed recording start instruction;
collect, according to the distributed recording start instruction, first audio data in a first periodicity, wherein the first audio data is first local audio data collected by the second device;
perform human voice enhancement or noise reduction processing on the first audio data in a second periodicity to produce second audio data; and
send the second audio data to the first device in the second periodicity to instruct the first device to invoke at least one piece of the second audio data with a camera application.

19. The second device of claim 18, wherein the one or more processors are further configured to execute the instructions to collect, based on a recording parameter corresponding to the distributed recording start instruction, the first audio data.

20. The second device of claim 18, wherein before the second device sends the second audio data, the one or more processors are further configured to execute the instructions to perform compression processing on the first audio data to obtain the second audio data.

* * * * *